(12) United States Patent
Miyoshi et al.

(10) Patent No.: US 8,971,962 B2
(45) Date of Patent: Mar. 3, 2015

(54) DISTRIBUTED ANTENNA SYSTEM, BASE STATION DEVICE, AND ANTENNA SELECTION CONTROL METHOD

(75) Inventors: Kingo Miyoshi, Yokohama (JP); Tsuyoshi Tamaki, Machida (JP)

(73) Assignee: Hitachi, Ltd., Tokyo (JP)

( * ) Notice: Subject to any disclaimer, the term of this patent is extended or adjusted under 35 U.S.C. 154(b) by 538 days.

(21) Appl. No.: 13/312,610

(22) Filed: Dec. 6, 2011

(65) Prior Publication Data

US 2012/0149411 A1 Jun. 14, 2012

(30) Foreign Application Priority Data

Dec. 8, 2010 (JP) ................................ 2010-273378

(51) Int. Cl.
*H04B 7/04* (2006.01)
*H04B 7/06* (2006.01)

(52) U.S. Cl.
CPC .............. *H04B 7/0413* (2013.01); *H04B 7/061* (2013.01); *H04B 7/0689* (2013.01); *H04B 7/0626* (2013.01)
USPC ..................................................... 455/562.1

(58) Field of Classification Search
None
See application file for complete search history.

(56) References Cited

U.S. PATENT DOCUMENTS

| | | | | |
|---|---|---|---|---|
| 5,953,325 | A | * | 9/1999 | Willars .......................... 370/335 |
| 2003/0114165 | A1 | * | 6/2003 | Mills ............................. 455/453 |
| 2010/0069122 | A1 | | 3/2010 | Ito |
| 2011/0122788 | A1 | * | 5/2011 | Sombrutzki et al. .......... 370/252 |

FOREIGN PATENT DOCUMENTS

| | | |
|---|---|---|
| JP | 2007-053768 | 3/2007 |
| JP | 2010-068496 | 3/2010 |

OTHER PUBLICATIONS

Channel unknown to transmitter; http://www.jpo.go.jp/shiryou/s_sonota/hyoujun_gijutsu/mimo/1-2-2.pdf; Mar. 25, 2005; pp. 16-19.

* cited by examiner

*Primary Examiner* — Philip Sobutka
(74) *Attorney, Agent, or Firm* — Foley & Lardner LLP

(57) ABSTRACT

An optimum communication mode and an optimum antenna are selected according to traffic and a radio propagation status of a terminal. With the use of traffic information between a base station and the terminal, an SISO communication or an SIMO communication is conducted if the traffic is small. It is determined whether the MIMO communication should be conducted, or not, if the traffic is large. An antenna that can exert the effect as the MIMO communication is selected by using the radio propagation channel state information between the distributed antennas of the base station and the antenna of the terminal. Also, because the selection of the antenna is changed by conducting the MIMO communication, an antenna optimum for the terminal that conducts the SISO communication or the SIMO communication is re-selected taking the interference influence on the terminal that conducts the SISO communication or the SIMO communication into account.

17 Claims, 22 Drawing Sheets

EXAMPLE OF DAS SWITCH CONFIGURATION BLOCK DIAGRAM

OPERATIONAL EXAMPLE OF DAS SWITCH

OPERATIONAL EXAMPLE OF DAS SWITCH (MIMO)

OPERATIONAL EXAMPLE OF DAS SWITCH (SIMO)

SIMO

① TO ④ ARE ANTENNA PORT NUMBERS OF BASE STATION DEVICE
(INPUT PORT OF DAS SWITCH)

|     | Slot1 DL | Slot1 UL | Slot2 DL | Slot2 UL | Slot3 DL | Slot3 UL | Slot4 DL | Slot4 UL | DL | UL | DL | UL | DL | UL | DL | UL | Slot1 DL | Slot1 UL | Slot2 DL | Slot2 UL | Slot3 DL | Slot3 UL | Slot4 DL | Slot4 UL |
|-----|----|----|----|----|----|----|----|----|----|----|----|----|----|----|----|----|----|----|----|----|----|----|----|----|
| #1  | ①* | ①* | ×  | ×  | ①  | ①  | ①  | ①  | ①  | ①  | ①  | ①  | ①  | ①  | ①* | ①* | ×  | ×  |
| #2  | ②* | ②* | ×  | ×  | ×  | ②  | ×  | ②  | ×  | ②  | ×  | ②  | ×  | ②  | ②* | ②* | ×  | ×  |
| #3  | ③* | ③* | ×  | ×  | ×  | ×  | ×  | ×  | ×  | ×  | ×  | ×  | ×  | ×  | ③* | ③* | ×  | ×  |
| #4  | ④* | ④* | ×  | ×  | ×  | ×  | ×  | ×  | ×  | ×  | ×  | ×  | ×  | ×  | ④* | ④* | ×  | ×  |
| #5  | ×  | ×  | ①* | ①* | ×  | ×  | ×  | ×  | ×  | ×  | ×  | ×  | ×  | ×  | ×  | ×  | ①* | ①* |
| #6  | ×  | ×  | ②* | ②* | ×  | ×  | ×  | ×  | ×  | ×  | ×  | ×  | ×  | ×  | ×  | ×  | ②* | ②* |
| #7  | ×  | ×  | ③* | ③* | ×  | ×  | ×  | ×  | ×  | ×  | ×  | ×  | ×  | ×  | ×  | ×  | ③* | ③* |
| #8  | ×  | ×  | ④* | ④* | ×  | ×  | ×  | ×  | ×  | ×  | ×  | ×  | ×  | ×  | ×  | ×  | ④* | ④* |

\* REFERENCE SIGNAL TRANSMISSION: (DL)

FEEDBACK (CSI INFORMATION) TRANSMISSION: (UL)

FIG.12

OPERATIONAL EXAMPLE OF DAS SWITCH (MIMO)

MIMO

① TO ④ ARE ANTENNA PORT NUMBERS OF BASE STATION DEVICE
(INPUT PORT OF DAS SWITCH)

|  | Slot1 | | Slot2 | | Slot3 | | Slot4 | | | | | | | | | | Slot1 | | Slot2 | | Slot3 | | Slot4 | |
|---|---|---|---|---|---|---|---|---|---|---|---|---|---|---|---|---|---|---|---|---|---|---|---|---|
|  | DL | UL | DL | UL | DL | UL | DL | UL | DL | UL | DL | UL | DL | UL | DL | UL | DL | UL | DL | UL | DL | UL | DL | UL |
| #1 | ①* | ①* | × | × | ① | ① | ① | ① | ① | ① | ① | ① | ① | ① | ①* | ①* | × | × |
| #2 | ②* | ②* | × | × | ② | ② | ② | ② | ② | ② | ② | ② | ② | ② | ②* | ②* | × | × |
| #3 | ③* | ③* | × | × | × | × | × | × | × | × | × | × | × | × | ③* | ③* | × | × |
| #4 | ④* | ④* | × | × | × | × | × | × | × | × | × | × | × | × | ④* | ④* | × | × |
| #5 | × | × | ①* | ①* | × | × | × | × | × | × | × | × | × | × | × | × | ①* | ①* |
| #6 | × | × | ②* | ②* | × | × | × | × | × | × | × | × | × | × | × | × | ②* | ②* |
| #7 | × | × | ③* | ③* | × | × | × | × | × | × | × | × | × | × | × | × | ③* | ③* |
| #8 | × | × | ④* | ④* | × | × | × | × | × | × | × | × | × | × | × | × | ④* | ④* |

\* REFERENCE SIGNAL TRANSMISSION: (DL)
FEEDBACK (CSI INFORMATION) TRANSMISSION: (UL)

FIG.13

OPERATIONAL EXAMPLE OF DAS SWITCH (NO.3)

① TO ④ ARE ANTENNA PORT NUMBERS OF BASE STATION DEVICE
(INPUT PORT OF DAS SWITCH)

SIMO

| | Slot1 | | Slot2 | | Slot3 | | Slot4 | | | | | | | | Slot1 | | Slot2 | |
|---|---|---|---|---|---|---|---|---|---|---|---|---|---|---|---|---|---|---|
| | DL | UL | DL | UL | DL | UL | DL | UL | DL | UL | DL | UL | DL | UL | DL | UL | DL | UL |
| #1 | ①* | ①* | × | × | ① | ① | ① | ① | ① | ① | ① | ① | ① | ① | ①* | ①* | × | × |
| #2 | ②* | ②* | × | × | × | × | × | × | ② | ② | ② | ② | ② | ② | ②* | ②* | × | × |
| #3 | ③* | ③* | × | × | × | × | × | × | × | × | × | × | × | × | ③* | ③* | × | × |
| #4 | ④* | ④* | × | × | ② | ② | ② | ② | × | × | × | × | × | × | ④* | ④* | × | × |
| #5 | × | × | ①* | ①* | × | × | × | × | × | × | × | × | × | × | × | × | ①* | ①* |
| #6 | × | × | ②* | ②* | × | × | × | × | ③ | ③ | ③ | ③ | ③ | ③ | × | × | ②* | ②* |
| #7 | × | × | ③* | ③* | × | × | × | × | × | × | × | × | × | × | × | × | ③* | ③* |
| #8 | × | × | ④* | ④* | × | × | × | × | × | × | × | × | × | × | × | × | ④* | ④* |

\* REFERENCE SIGNAL TRANSMISSION: (DL)
  FEEDBACK (CSI INFORMATION) TRANSMISSION: (UL)

FIG.17

DATABASE LAYOUT OF CHANNEL STATE INFORMATION (CSI)

REMARKS: PREPARED ON THE BASIS OF FIG. 15 AS AN EXAMPLE

| ANTENNA NUMBER | TERMINAL 700 | TERMINAL 701 |
|---|---|---|
| #1 | h1a,h1b | h1c,h1d |
| #2 | h2a,h2b | h2c,h2d |
| #3 | h3a,h3b | H3c,h3d |
| #4 | h4a,h4b | h4c,h4d |
| #5 | h5a,h5b | h5c,h5d |
| #6 | h6a,h6b | h6c,h6d |
| #7 | h7a,h7b | h7c,h7d |
| #8 | h8a,h8b | h8c,h8d |
| ... | ... | ... |
| #n | h1na,h12b | h12c,h12d |

FIG.20

DISTRIBUTED ANTENNA SYSTEM, BASE STATION DEVICE, AND ANTENNA SELECTION CONTROL METHOD

CLAIM OF PRIORITY

The present application claims priority from Japanese patent application JP 2010-273378 filed on Dec. 8, 2010, the content of which is hereby incorporated by reference into this application.

BACKGROUND OF THE INVENTION

1. Technical Field

The present invention relates to a distributed antenna system, a base station device, and an antenna selection control method, and more particularly to a distributed antenna system, a base station device, and an antenna selection control method intended for an MIMO using a distributed antenna system (DAS) switch.

2. Background Art

In order to improve a radio environment within a building having a difficulty in receiving radio waves, there has been known a distributed antenna system (DAS) in which antennas are distributed within the building. In the related-art distributed antenna system, there has been known a method in which a leakage coaxial cable is extended from a base station device, and radio waves are radiated around the laid cable. Also, there has been known a method in which analog transmission signals input or output by the base station device are distributed to plural antennas by the coaxial cable through a device that decouples and couples the analog transmission signal. In the related-art distributed antenna system, because the input/output signal of the base station device is distributed to the plural antennas, the same signal is input and output with respect to all of the antennas. In recent years, a fast wireless communication such as a long term evolution (LTE) or a worldwide interoperability for microwave access (WiMAX) is about to be prepared. Those communication systems employ a multiple input multiple output (MIMO) technology that transmits data from plural antennas, and receives data with the plural antennas from the viewpoint of an improvement in frequency usage efficiency. In this MIMO technology, because there is a need to transmit and receive different signals with respect to the plural antennas, the different signals have been also required to be transmitted or received with respect to the plural antennas even in the distributed antenna system.

JP-A-2010-068496 discloses a background art in which the MIMO technology is applied to the distributed antenna system. According to the disclosure of this publication, "A power measurement unit of a terminal measures a received power of a pilot signal transmitted from each antenna of the distributed antenna system for a long time. The terminal selects a given number of antennas high in the received power as communication antenna candidates, and notifies a radio base station device of the communication antenna candidates and the corresponding received powers. A channel estimate unit of the terminal receives information on communicatable antennas and antenna index information allocated to the communicatable antennas from the radio base station device, and estimate channels of the communicatable antennas. In order to conduct the MIMO communication, there is a need to determine a precoding matrix that computes a transmission signal of the base station device. The terminal finds a precoding matrix index (PMI) related to the communicatable antennas on the basis of the channel estimation of the terminal, and notifies the radio base station device of the precoding matrix index with the help of the antenna index information through communication, to thereby control a phase rotation amount and a power ratio of each antenna that executes data communication."

Also, JP-A-2007-53768 discloses as follows: "uplink information from each radio access unit is estimated to acquire a distance attenuation between the radio access unit and each user. A distance attenuation estimator stores the respective distance attenuations in association with numbers of the radio access units. A resource allocator acquires resource allocation information including information on the radio access unit employed by the user on the basis of the stored distance attenuations and numbers of the radio access units. A transmission processor conducts corresponding transmission signal processing on the user data on the basis of the resource allocation information, and generates a baseband signal stream for the radio access unit employed by the user. A radio access unit selector selects a corresponding radio access unit from all of the radio access units connected to a central processing unit on the basis of the resource allocation information, and transmits each baseband signal stream processed by the transmission processor to the selected radio access unit. Then, radio access unit conducts up-convert processing on baseband signal stream output from the radio access unit selector, and transmits the baseband signal stream subjected to the up-convert processing to the corresponding radio access unit through a transmission link as downlink information."

SUMMARY OF THE INVENTION

When the above-mentioned distributed antenna system (hereinafter referred to as "DAS") operates so that the same radio signal is transmitted from all of the antennas, there is advantageous in that a wide area is covered. On the other hand, a signal to be transmitted to only a specific terminal is transmitted from unnecessary antennas. Also, in the case where the specific terminal conducts the MIMO communication, if the technique of the above-mentioned JP-A-2010-068496 is applied to the MIMO communication, even if an antenna for the MIMO communication is selected, there is no disclosure in JP-A-2010-068496 of whether the other antennas are used for communication, or not. Because the antennas other than the MIMO communication antenna cause interference, it is conceivable that the other antennas are not used. However, an antenna distant from the other antennas to some degree enables a communication with another user. Also, in JP-A-2010-068496, it is assumed that the MIMO communication is always conducted, and there is a need to always feed information on the PMI from the terminal back to the base station. If a communication traffic volume between the terminal and the base station is small, it is only necessary to conduct an SISO (single input single output) communication or an SIMO (single input multiple output) communication by one transmitting and receiving antenna without conducting the MIMO communication. If the MIMO communication is continued, a radio resource is consumed for PMI feedback, and unnecessary signal processing such as channel estimation processing for the plural antennas is conducted.

Also, JP-A-2007-53768 discloses that a physical resource such as the antenna is selected on the basis of the distance attenuation between the terminal and the base station. According to this disclosure, an antenna closer to the terminal is selected. However, if, for example, two antennas are selected in the MIMO communication, even if the distance attenuations between the terminal and the selected two antennas are small, a radio propagation channel high in correlation may not exert the effect as the MIMO communication.

The present invention has been made in view of the above circumstances, and therefore one object of the present invention is to provide a technique in which a communication system such as the MIMO communication, the SISO communication, or the SIMO communication can be optimally selected according to the traffic volume of the terminal, the consumption of the radio resource attributable to feedback of the PMI information can be saved as compared with a case in which a communication always using the plural antennas such as the MIMO communication is conducted, and/or an effective radio communication is realized.

Another object of the present invention is to provide a technique in which a terminal that conducts a communication using one antenna for transmission or reception such as the SISO communication or the SIMO communication is selected to provide a signal throughput required according to the traffic, and the power consumption of the terminal is reduced as compared to a case in which a communication always using the plural antennas such as the MIMO communication is conducted.

Still another object of the present invention is to provide a technique in which because the antenna is re-selected on the basis of radio propagation channel state information in order to conduct a communication using the plural antennas such as the MIMO communication, an antenna that can exert the effect in the communication using the plural antennas such as the MIMO communication is selected.

Yet still another object of the present invention is to provide a technique in which, when a specific terminal conducts a communication using plural antennas such as the MIMO communication, a throughput of the overall system is improved by re-selecting an antenna that is large in a signal to interference noise power ratio and high in quality, taking into account an influence of interference of terminals sharing the antennas used in the communication using the plural antennas such as the MIMO communication on the terminal that conducts the communication using one antenna in transmission or reception such as the SISO communication or the SIMO communication.

In the present invention, in order to solve the above problem, there is provided a distributed antenna system in which, for example, using traffic information between the base station and the terminal, the SISO communication or the SIMO communication is conducted if the traffic is small, it is determined whether the MIMO communication should be conducted, or not, if the traffic is large, and an antenna that can exert the effect as the MIMO communication is selected by using the radio propagation channel state information between the distributed antennas of the base station and the antenna of the terminal. Also, because the selection of the antenna is changed by conducting the MIMO communication, an antenna optimum for the terminal that conducts the SISO communication or the SIMO communication is re-selected taking the interference influence on the terminal that conducts the SISO communication or the SIMO communication into account.

According to the present invention, the distributed antenna system includes, for example, a base station device having plural antenna ports, a terminal having plural antennas, and an antenna switch that spatially distributes plural distribution devices, and switches a connection of the antennas of the distribution devices and the antenna ports of the base station device between uplink and downlink communications. The base station device includes a unit that collects traffic information on the uplink and downlink communications, a unit that collects information on radio propagation channels from the distributed antennas to the antennas of the terminal, a unit that determines whether a multiple input multiple output (MIMO) communication is conducted, or not, and a unit that selects an antenna of the terminal that conducts a single input single output (SISO) communication or a single input multiple output (SIMO) communication when a given terminal is going to conduct the MIMO communication. If a traffic volume of the terminal is lower than a given threshold value, the SISO communication or the SIMO communication is conducted according to the traffic volume. If the traffic volume of the terminal is the given threshold value or higher, it is determined whether the MIMO communication is conducted, or not. If the terminal is going to conduct the MIMO communication, it is determined whether another terminal that conducts the SISO communication or the SIMO communication selects another antenna, or not, and an optimum antenna is reselected.

In the unit that determines whether the MIMO communication is conducted, or not, if the traffic of the terminal exceeds a given threshold value, a channel capacity of each antenna is calculated according to channel state information (CSI) between each antenna of the distributed antenna system and the terminal, and an anticipated communication speed of each antenna is estimated, all of the antennas are listed up in a descending order of the anticipated communication speed. When the top N antennas in the list are combined together, if the anticipated communication speed is a threshold value or higher, the MIMO is applied. When the top N antennas in the list are combined together, if the anticipated communication speed is lower than the threshold value, the MIMO is not applied. As a result, the MIMO communication is conducted only when the effect of the MIMO communication can be exerted on the basis of the channel state information.

It is assumed that the calculation of the channel capacity refers to calculation expressions disclosed in http:///www.j-po.go.jp/shiryou/s_sonota/hyoujun_gijutsu/mimo/1-2-2. pdf#page=1, and http:///www.jpo.go.jp/shiryou/s_sonota/hyoujun_gijutsu/mimo/1-2-2. pdf#page=3

Alternatively, in the unit that determines whether the MIMO communication is conducted, or not, when the traffic of one terminal exceeds the given threshold value, if the number of other terminals using the antenna used by that terminal is a threshold value or higher, the MIMO communication is conducted. If the number of other terminals is lower than the threshold value, the MIMO communication may not be conducted.

Also, in the above case, when it is determined that a specific terminal conducts the MIMO communication, in the unit that selects the antennas of the terminal that conducts the SISO communication or the SIMO communication, another terminal that conducts the SISO or SIMO communication connected to the antenna used by the terminal that conducts the MIMO communication is selected, a carrier interference noise ratio (CINR) between the terminal and each antenna is measured, and the antenna highest in the CINR for the terminal that conducts the SISO or SIMO communication can be reselected among the antennas in which the CINR is the threshold value or higher.

The CINR is calculated, for example, every time the CSI has been acquired. As a parameter other than the CINR, a signal noise ratio (SNR) may be used for reselection of the antenna.

According to the first solving means of the present invention, there is provided a distributed antenna system comprising a base station device having a plurality of antenna ports, a terminal having a plurality of antennas, and an antenna switch that switches a connection between antennas of a plurality of distribution devices that are spatially distributed and the antenna ports of the base station device, in uplink and downlink communications, wherein the base station device comprises:

a traffic information collection unit that collects traffic information on the uplink and downlink communications;

a channel state information collection unit that collects information on radio propagation channels from the distributed antennas to the antennas of the terminal; and a changeover determination unit that determines a changeover between a first communication using a plurality of antennas for communication with one terminal and a second communication using one antenna for transmission or reception with respect to one terminal, on the basis of information from the traffic information collection unit and the channel state information collection unit, and if a traffic volume of the terminal is lower than a given first threshold value, the changeover determination unit determines to conduct the second communication, if the traffic volume of the terminal is the first threshold value or higher, the changeover determination unit conducts a first determination that the terminal applies the first communication if the terminal is applying the first communication and a communication speed or throughput by the combination of the present antennas is a given second threshold value or higher, if the terminal is applying the first communication, and the communication speed or throughput by the combination of the present antennas is lower than the second threshold value, or the terminal is not applying the first communication, (i) the changeover determination unit determines to conduct a second determination that, when the plurality of antennas is combined together, the terminal applies the first communication if the communication speed or throughput is a given third threshold value or higher, and the terminal applies the second communication if the communication speed or throughput is lower than the third threshold value, or (ii) the changeover determination unit determines to conducts a third determination that the terminal applies the first communication if the number of other terminals using the antenna used by the subject terminal is a fourth threshold value or higher, and applies the second communication if the number of other terminals is lower than the fourth threshold value.

According to the second solving means of the present invention, there is provided a base station device in a distributed antenna system comprising the base station device having a plurality of antenna ports, a terminal having a plurality of antennas, and an antenna switch that switches a connection between antennas of a plurality of distribution devices that are spatially distributed and the antenna ports of the base station device, in uplink and downlink communications, comprising:

a traffic information collection unit that collects traffic information on the uplink and downlink communications;

a channel state information collection unit that collects information on radio propagation channels from the distributed antennas to the antennas of the terminal; and a changeover determination unit that determines a changeover between a first communication using a plurality of antennas for communication with one terminal and a second communication using one antenna for transmission or reception with respect to one terminal, on the basis of information from the traffic information collection unit and the channel state information collection unit, and if a traffic volume of the terminal is lower than a given first threshold value, the changeover determination unit determines to conduct the second communication, if the traffic volume of the terminal is the first threshold value or higher, the changeover determination unit conducts a first determination that the terminal applies the first communication if the terminal is applying the first communication and a communication speed or throughput by the combination of the present antennas is a given second threshold value or higher, if the terminal is applying the first communication, and the communication speed or throughput by the combination of the present antennas is lower than the second threshold value, or the terminal is not applying the first communication, (i) the changeover determination unit determines to conduct a second determination that, when the plurality of antennas is combined together, the terminal applies the first communication if the communication speed or throughput is a given third threshold value or higher, and the terminal applies the second communication if the communication speed or throughput is lower than the third threshold value, or (ii) the changeover determination unit determines to conducts a third determination that the terminal applies the first communication if the number of other terminals using the antenna used by the subject terminal is a fourth threshold value or higher, and applies the second communication if the number of other terminals is lower than the fourth threshold value.

According to the third solving means of the present invention, there is provided an antenna selection method in a distributed antenna system comprising a base station device having a plurality of antenna ports, a terminal having a plurality of antennas, and an antenna switch that switches a connection between antennas of a plurality of distribution devices that are spatially distributed and the antenna ports of the base station device, in uplink and downlink communications, wherein the base station device comprises:

a traffic information collection unit that collects traffic information on the uplink and downlink communications;

a channel state information collection unit that collects information on radio propagation channels from the distributed antennas to the antennas of the terminal; and a changeover determination unit that determines a changeover between a first communication using a plurality of antennas for communication with one terminal and a second communication using one antenna for transmission or reception with respect to one terminal, on the basis of information from the traffic information collection unit and the channel state information collection unit, and if a traffic volume of the terminal is lower than a given first threshold value, the changeover determination unit determines to conduct the second communication, if the traffic volume of the terminal is the first threshold value or higher, the changeover determination unit conducts a first determination that the terminal applies the first communication if the terminal is applying the first communication and a communication speed or throughput by the combination of the present antennas is a given second threshold value or higher, if the terminal is applying the first communication, and the communication speed or throughput by the combination of the present antennas is lower than the second threshold value, or the terminal is not applying the first communication, (i) the changeover determination unit determines to conduct a second determination that, when the plurality of antennas is combined together, the terminal applies the first communication if the communication speed or throughput is a given third threshold value or higher, and the terminal applies the second communication if the communication speed or throughput is lower than the third threshold value, or (ii) the changeover determination unit determines to conducts a third determination that the terminal applies the first communication if the number of other terminals using the antenna used by the subject terminal is a fourth threshold value or higher, and applies the second communication if the number of other terminals is lower than the fourth threshold value.

It is possible, by the present invention, to provide a technique in which a communication system such as the MIMO communication, the SISO communication, or the SIMO communication can be optimally selected according to the traffic volume of the terminal, the consumption of the radio resource attributable to feedback of the PMI information can be saved as compared with a case in which a communication always using the plural antennas such as the MIMO communication is conducted, and/or an effective radio communication can be realized.

It is possible, by the present invention, to provide a technique in which a terminal that conducts a communication using one antenna for transmission or reception such as the SISO communication or the SIMO communication is selected to provide a signal throughput required according to the traffic, and the power consumption of the terminal can be reduced as compared to a case in which a communication always using the plural antennas such as the MIMO communication is conducted.

Still, It is possible, by the present invention, to provide a technique in which because the antenna is re-selected on the basis of radio propagation channel state information in order to conduct a communication using the plural antennas such as the MIMO communication, an antenna that can exert the effect in the communication using the plural antennas such as the MIMO communication is selected.

Yet still, It is possible, by the present invention, to provide a technique in which, when a specific terminal conducts a communication using plural antennas such as the MIMO communication, a throughput of the overall system can be improved by re-selecting an antenna that is large in a signal to interference noise power ratio and high in quality, taking into account an influence of interference of terminals sharing the antennas used in the communication using the plural antennas such as the MIMO communication on the terminal that conducts the communication using one antenna in transmission or reception such as the SISO communication or the SIMO communication.

BRIEF DESCRIPTION OF THE DRAWINGS

FIG. 12 is a diagram illustrating a DAS switch (SIMO) according to one embodiment;

FIG. 13 is a diagram illustrating a DAS switch (MIMO) according to another embodiment;

FIG. 17 is a diagram illustrating a DAS switch according to still another embodiment (No. 3);

FIG. 20 is a diagram illustrating a database layout of channel state information (CSI);

DETAILED DESCRIPTION OF THE EMBODIMENTS

Hereinafter, embodiments according to the present invention will be described.

A. First Embodiment

1. System Configuration

Figure 1:
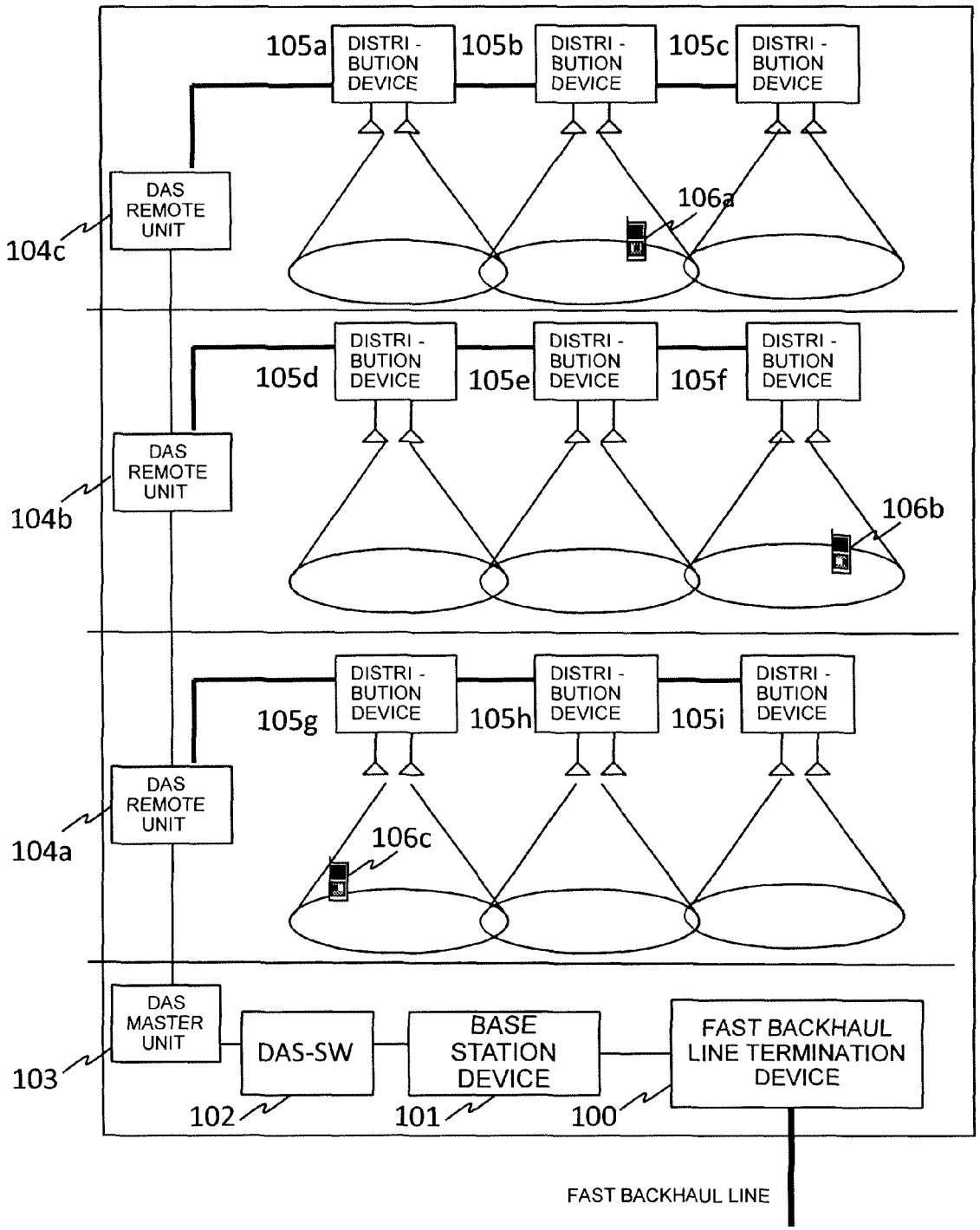
FIG. 1 is a diagram illustrating one configuration example of a DAS.

FIG. 1 illustrates a configuration example of a DAS according to this embodiment. In a downlink, a data signal from a fast backhaul goes through a fast backhaul line termination device 100, and is subjected to encoding, modulation, and amplification processing according to a radio communication system in a base station device 101. A DAS switch 102 has an input end connected to an antenna port of the base station device 101, and an output end connected to a DAS master unit 103. A switching control between antenna ports of the base station device 101 and antennas of the distributed antenna system is conducted by the switch 102. A signal terminated and relayed by the DAS master unit 103 is relayed to DAS remote units 104a to 104c located at the respective floors of a building, and the signal is transmitted to distribution devices 105a to 105i according to the switching control of the DAS switch 102. Thereafter, a data signal is appropriately transmitted from each antenna within the distribution devices 105a to 105i. An uplink has a process opposite to the above process. The DAS switch in FIG. 1 is located between the base station device and the DAS master unit. As other configurations of the DAS switch, the DAS switch may be incorporated into the base station device, or incorporated into the DAS master unit.

Figure 2:
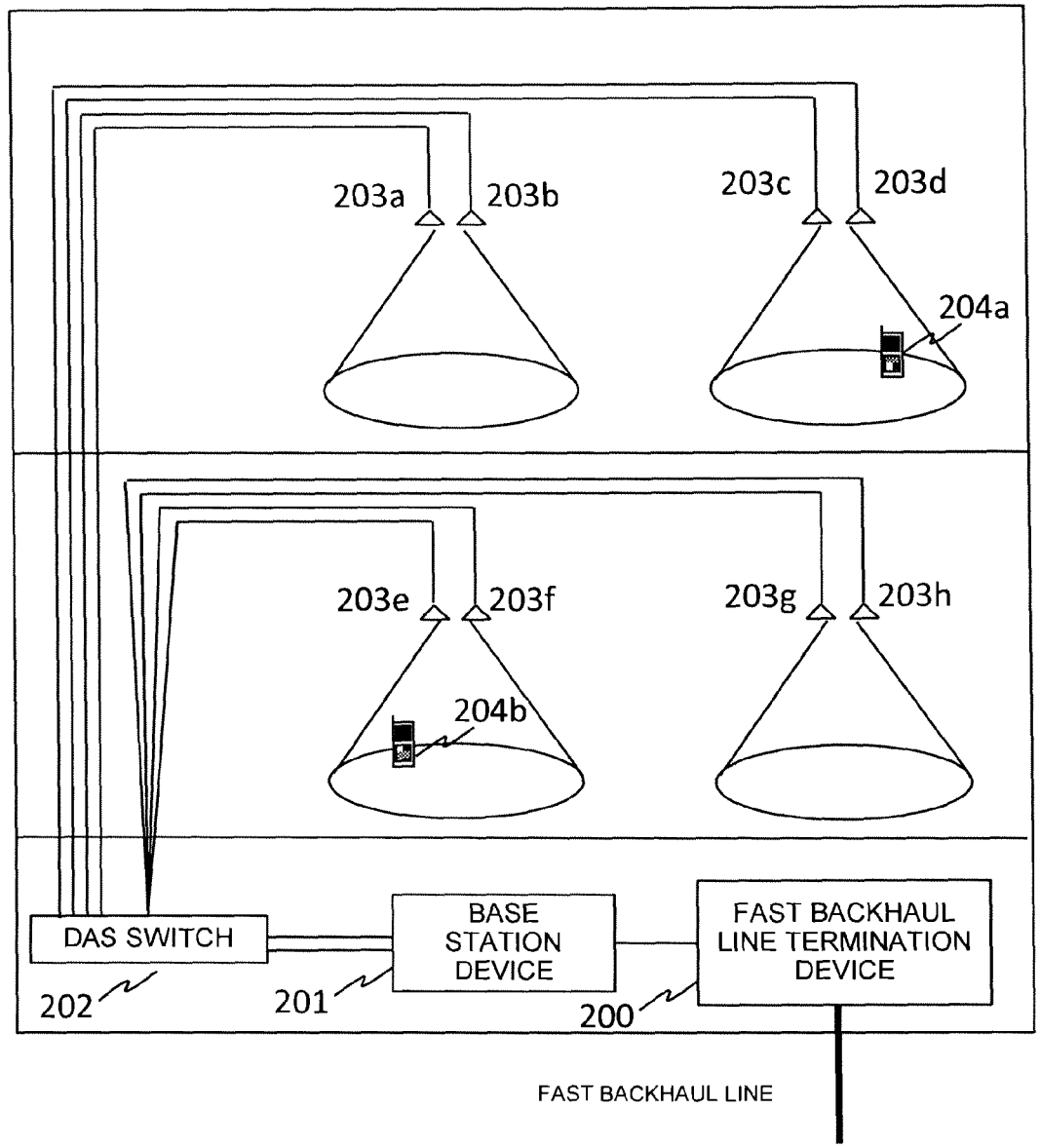
FIG. 2 is a diagram illustrating another configuration example (antenna is distributed directly from DAS-SW) of the DAS.

FIG. 2 illustrates another configuration example of the DAS. FIG. 2 illustrates a configuration example of the DAS in a scale smaller than the building assumed in the configuration example of FIG. 1. In the downlink, the data signal from the fast backhaul line goes through a fast backhaul line termination device 200 and a base station device 201 as in FIG. 1. A difference from FIG. 1 resides in that a DAS switch 202 is connected directly to antennas 203a to 203h. In this case, the DAS switch 202 may have not only a function of the switching control but also a function of signal termination and relay which is the function of the DAS master unit 103 in FIG. 1. The uplink has a process opposite to the above process.

Figure 3:
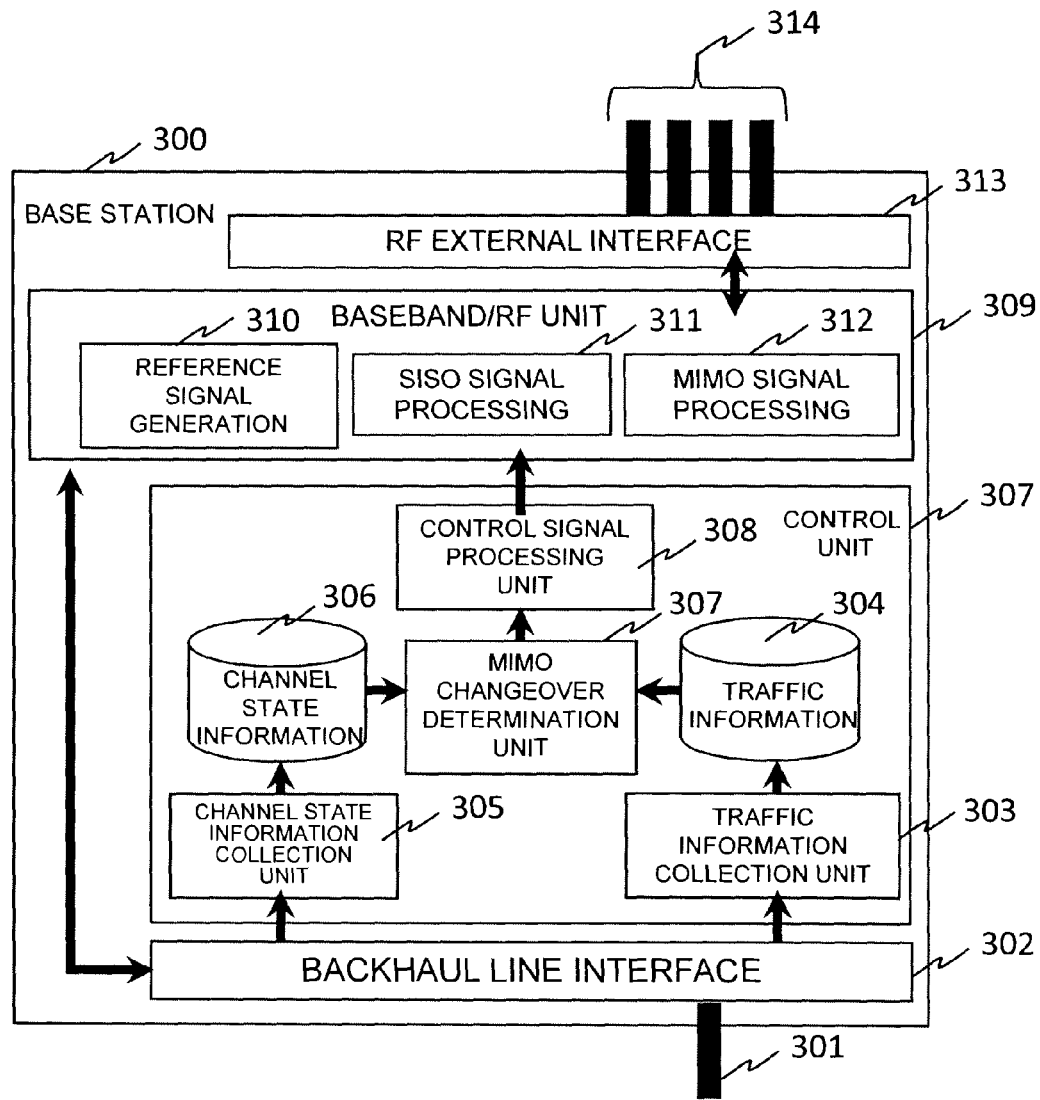
FIG. 3 is a block diagram illustrating a configuration of a base station.

FIG. 3 illustrates an example of a base station configuration block diagram. A base station 300 roughly includes a fast backhaul line 301 that is a data transmitting and receiving path between the base station and a fast backhaul, a backhaul line interface 302 that terminates the backhaul line, a control unit 307, a baseband/ratio frequency (RF) unit 309 that conducts the generation, modulation, and amplification of a signal, and the other signal processing, an RF external interface 313, and an antenna port 314. The control unit 307 includes a traffic information collection unit 303, a traffic information 304 that is a database of traffic information, a channel state information collection unit 305 that collects channel state information (CSI) necessary for the switching control of the switch and the communication of the MIMO, a channel state information 306 that is a database of the channel state information, an MIMO changeover determination unit 307 that determines whether the MIMO is implemented, or not, on the basis of the traffic information 304 and the channel state information 306, and a control signal processing unit 308 that conducts signal processing for controlling the switch changeover according to a flow determined by the MIMO changeover determination unit 307. The baseband/RF unit 309 includes, in addition to the baseband signal processing and the RF signal processing, functions of a reference signal generation 310 for the antenna changeover and the MIMO communication, an SISO signal processing 311, and an MIMO signal processing 312. The signal processed by the baseband/RF unit 309 is modified and amplified into an RF signal, and thereafter transmitted from the antenna port 314 through the RF external interface 313. In all of the embodiments according to the present invention, the traffic means a traffic volume in the downlink, but may mean a traffic volume in the uplink as another configuration. Also, the SISO signal processing 311 may be replaced with an SIMO signal processing 311 that receives the signal by plural antennas taking diversity reception into account.

Figure 4:
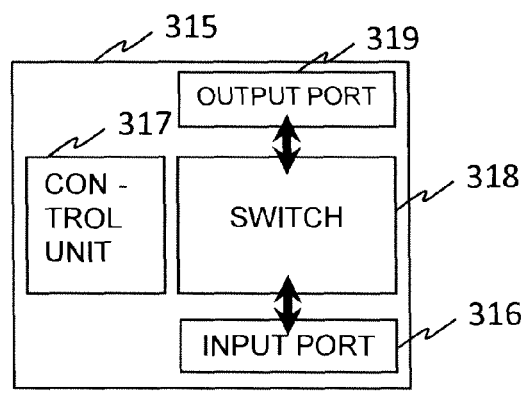
FIG. 4 is a block diagram illustrating a configuration of a DAS switch.

FIG. 4 illustrates an example of the DAS switch configuration block diagram. A DAS switch 315 includes an input port 316 connected to a base station antenna port, a control unit 317 that processes a switch changeover control signal from the base station, a switch 318 that conducts the changeover under the control of the control unit 317, and an output port 319 connected to the DAS master unit or the DAS antenna.

2. MIMO Changeover Determination Flow

Figure 5:
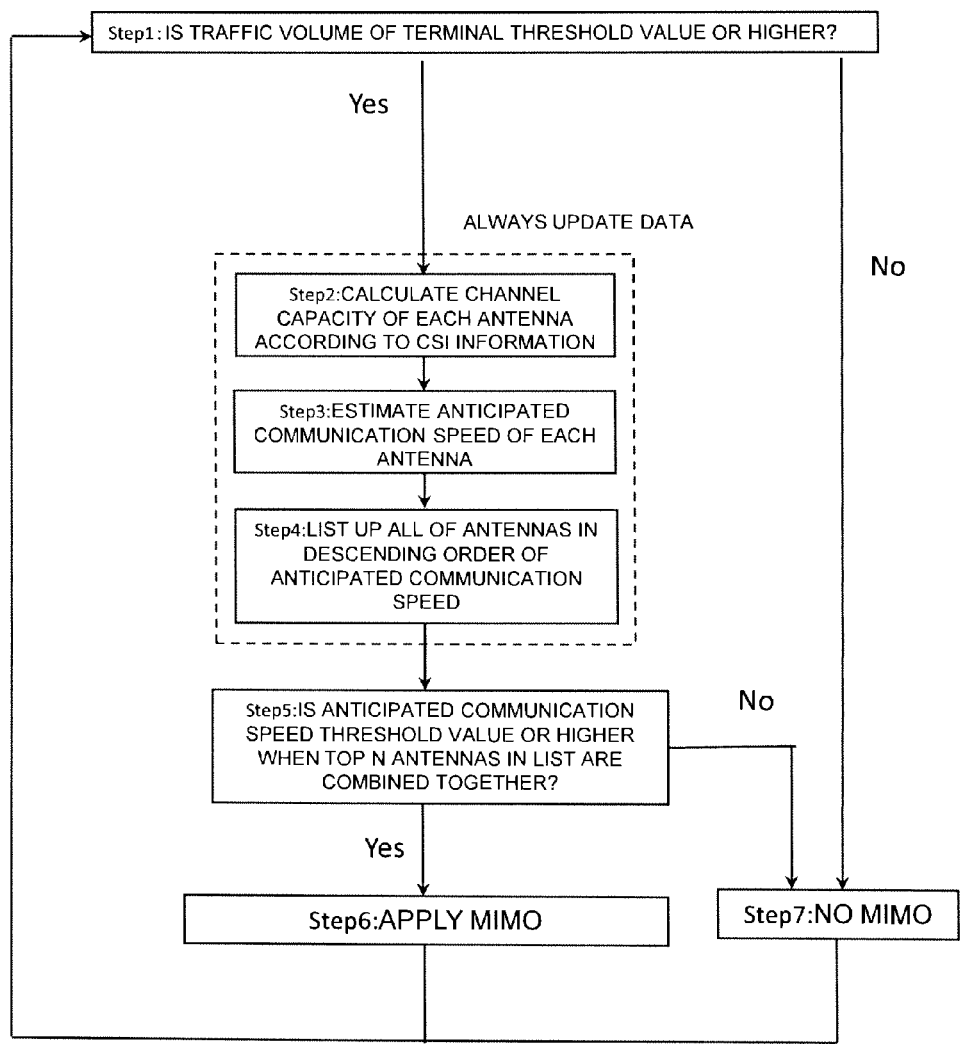
FIG. 5 is a flowchart illustrating an example (No. 1) of an MIMO changeover determination unit within the base station.

FIG. 5 is a flowchart illustrating an example (No. 1) of an MIMO changeover determination unit within the base station. This flowchart illustrates internal processing of the MIMO changeover determination unit 307 within the base station 300 in FIG. 3, and is focused on one specified terminal. If the traffic to the terminal exceeds a given threshold value (Step 1), the channel capacity of the respective DAS antennas is calculated from the respective channel state information (CSI) (Step 2). The CSI is used as the antenna changeover. Subsequently, an anticipated communication speed of the respective antennas is estimated on the basis of the calculated channel capacity. The anticipated communication speed is calculated by, for example, dividing the channel capacity by the number of terminals connected to the antenna. Thereafter, all of the antennas are listed up in the descending order of the anticipated communication speed (Step 4). Further, when the top N antennas in the list are combined together, if the anticipated communication speed is a threshold value or higher (Step 5), the MIMO is applied (Step 6). If the traffic volume is lower than the threshold value in Step 1, or the anticipated communication speed is lower than the threshold value in Step 5, no MIMO is applied (Step 7). After Step 6 or 7, the processing is returned to Step 1. The MIMO changeover determination is implemented regularly or periodically. Data (CSI information) is updated every time the MIMO changeover is determined, and therefore, the top antennas in the anticipated communication speed list are applied for the MIMO communication. As the threshold value in Step 1, a threshold value for switching the MIMO communication to the SISO communication or the SIMO communication may be set in addition to the threshold value for switching the SISO communication or the SIMO communication to the MIMO communication.

Figure 6:
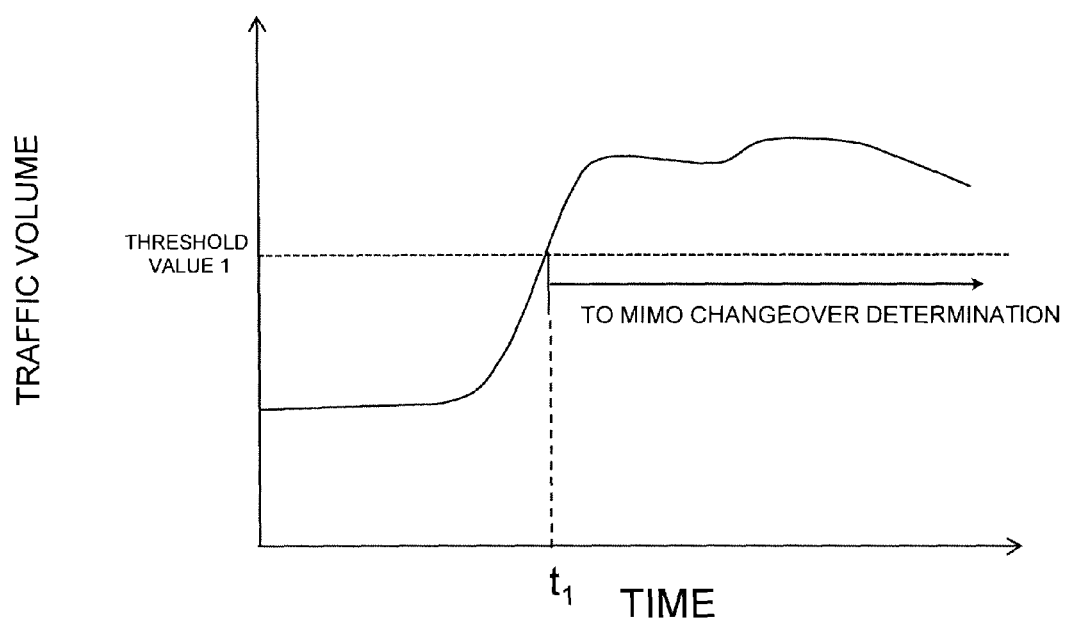
FIG. 6 is a graph illustrating traffic volume determination in a traffic information collection unit within the base station.

FIG. 6 illustrates an example of a traffic volume determination diagram. The axis of ordinate represents the traffic volume, and the axis of abscissa is a time. The traffic volume is determined with the use of data of the traffic information 304 within the base station 300 in FIG. 3. If the traffic volume is lower than a threshold value 1, the MIMO communication is not implemented, and only the SISO communication or the SIMO communication is implemented. At a given time $t_1$, if the traffic volume becomes the threshold value 1 or higher, the processing is advanced to a subsequent step of the MIMO changeover determination. In a flowchart of FIG. 5, 7, or 22 to be described later, the step corresponds to a flow from Step 1 to Step 2. In a flowchart of FIG. 18, 19, or 21 to be described later, the step corresponds to a flow from Step 2 to Step 3.

3. DAS Switch

Figure 8:
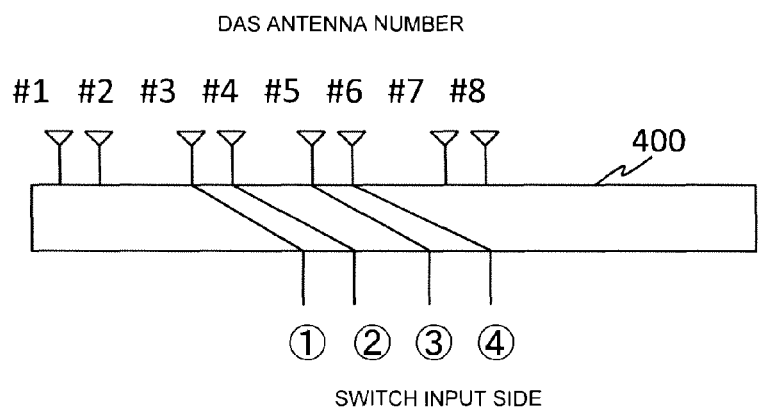
FIG. 8 is a diagram illustrating an example of a DAS switch.

FIG. 8 illustrates an operational example of the DAS switch. A DAS switch 400 has four ports at the input terminal and eight ports at the output terminal as an example. The input terminal is connected to the antenna ports of the base station device 101 in FIG. 1 or the base station device 201 in FIG. 2. The output terminal is connected to the DAS master unit 103 in FIG. 1 or the antennas 203a to 203h in FIG. 2. FIG. 8 illustrates a state in which input terminals (that is, the antenna ports of the base station device)<1> to <4> are connected to the respective antenna numbers #3 to #6 of the output terminal, respectively. In this case, four antennas of the antenna numbers #3 to #6 operate as four independent antennas for the base station device 101.

Figure 9:
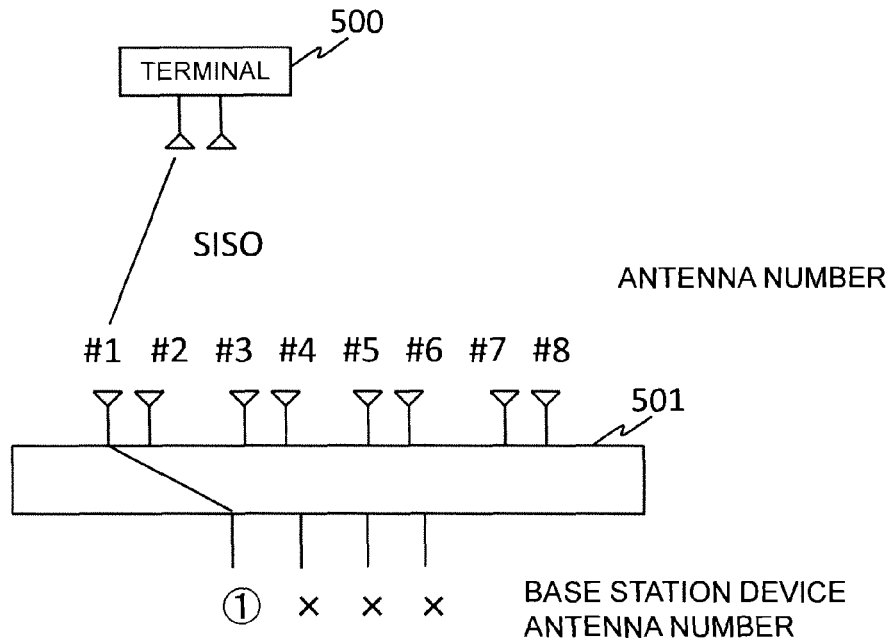
FIG. 9 is a diagram illustrating an example (SISO) of the DAS switch.

FIG. 9 illustrates an operational example of the DAS switch when the SISO is applied. In FIG. 9, in a DAS switch 501, the antenna port <1> of the base station device is connected to an antenna #1. The other antenna ports of the base station device are not connected within the DAS switch 501. Accordingly, an SISO communication is conducted between a terminal 500 and the antenna #1.

Figure 10:
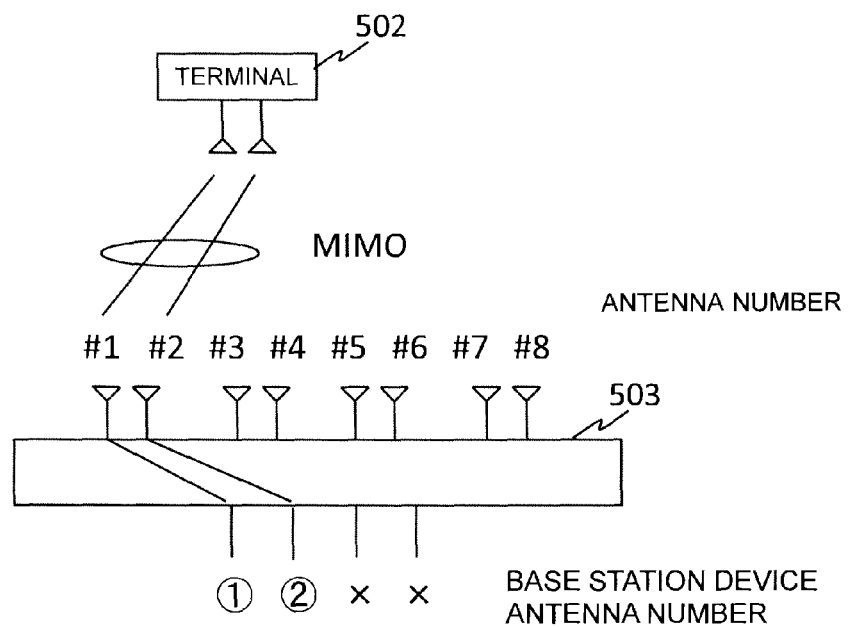
FIG. 10 is a diagram illustrating an example (MIMO) of the DAS switch.

FIG. 10 illustrates an operational example of the DAS switch when the MIMO is applied. In FIG. 10, in a DAS switch 503, the antenna port <1> of the base station device is connected to the antenna #1, and the antenna port <2> of the base station device is connected to the antenna #2. The other antenna ports of the base station device are not connected within the DAS switch 501. Accordingly, an MIMO communication using two transmitting and receiving antennas is conducted between the terminal 500 and the antennas #1, #2.

In the above example, the connection of the SISO communication and the MIMO communication is exemplified. However, an unused antenna port of the base station may be connected to another antenna to communicate with another user terminal.

4. Sequence 1 (A Case of One Terminal)

Figure 11:
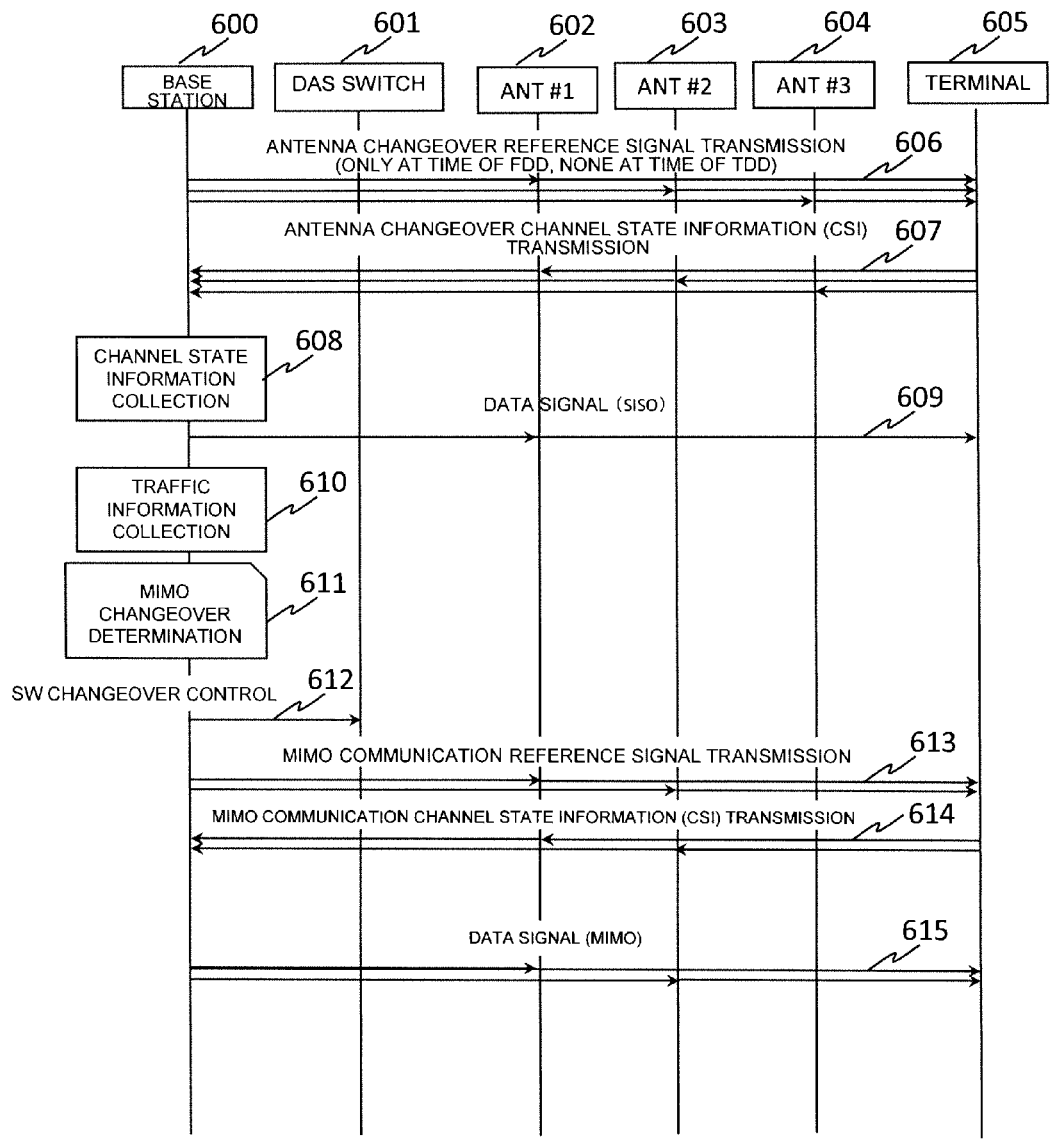
FIG. 11 is a sequence diagram when one terminal is provided.

FIG. 11 illustrates a sequence between the base station device and the terminal when one terminal is provided.

An antenna changeover reference signal 606 transmitted from a base station 600 goes through a DAS switch 601, and is then transmitted from antennas 602 to 604, and received by a terminal 605. Thereafter, the terminal 605 obtains channel state information (CSI) according to a reference signal through channel estimation processing, and transmits an antenna changeover channel state information (CSI) 607 as a feedback signal. The antenna changeover channel state information (CSI) 607 is received by the respective antennas 602 to 604, and received by the base station 600 through the DAS switch 601. In a time division duplex (TDD) system, the antenna changeover reference signal may not be transmitted, and a known sounding signal may be transmitted to the uplink to obtain the channel state information (CSI) from the sounding signal received at the base station side through the channel estimation processing, and the obtained channel state information may be utilized as the channel state information of the downlink.

Thereafter, in a channel state information collection 608, the channel state information collection unit 305 brings the acquired channel state information into a database. For example, as the database, the antenna numbers corresponding to the number of antennas to be used are stored in association with the channel state information (CSI) of the subject terminal. In this state, a data signal (SISO) 609 is transmitted from the base station 600 to the terminal 605, and in this situation, the data traffic volume is tallied in a traffic information collection 610 by the traffic information collection unit 303. In this example, the SISO is assumed. Apart from this example, a case in which the data signal is transmitted through an appropriate communication system such as the SIMO or the MIMO can be assumed.

On the basis of the above traffic information and channel state information, in an MIMO changeover determination 611, the MIMO changeover determination unit 307 determines whether the MIMO is implemented, or not. If the MIMO is implemented, an optimum antenna is selected according to the channel state information, and a switch changeover control 612 is conducted by the control signal processing unit 308 with the selected antenna from the base station 600 to the DAS switch 601. Upon completion of the switch changeover control, an MIMO communication reference signal 613 from the base station 600 is transmitted from the antennas 602 and 603 through the DAS switch 601, and received by the terminal 605. Thereafter, MIMO communication channel state information (CSI) 614 is transmitted from the terminal 605, goes through the antennas 602 and 603 and the DAS switch 601, and is received by the base station 600. Thereafter, a data signal (MIMO) 615 transmitted from the base station 600 goes through the DAS switch 601, and is received by the terminal 605 with the aid of the antennas 602 and 603. In this way, an optimum antenna for the MIMO communication is selected, and the MIMO communication is conducted with the use of the selected antenna.

FIG. 12 illustrates an operational example of the DAS switch when the SIMO is applied. FIG. 12 illustrates a correspondence between a time represented by the axis of abscissa and the antenna ports <1> to <4> of the base station device at the downlink (DL) and the uplink (UL) of the respective antennas #1 to #8. When a description will start from a left side of the drawing, in a first DL, the antenna ports <1>, <2>, <3>, and <4> of the base station device are coupled in the antennas #1, #2, #3, and #4, and used for transmission of the antenna changeover reference signal. In the drawing, Slot1 is a switching time and a period during which the base station device transmits the antenna changeover reference signal. The antennas #5 to #8 are connected to none of the antennas of the base station device. The first UL holds the same switching state as that of the DL, but is used for the antenna changeover channel state information (CSI) transmission of the terminal. In the drawing, Slot2 is a switching time and a period during which the terminal transmits the antenna changeover channel state information (CSI). In the second DL, the antenna ports <1>, <2>, <3>, and <4> of the base station device are coupled in the antennas #5, #6, #7, and #8, and used for transmission of the antenna changeover reference signal. In the drawing, Slot3 is a switching time and a period during which the base station device transmits the antenna changeover reference signal. The antennas #1 to #4 are not connected to any of the antennas of the base station device. The second UL holds the same switching state as that of the second DL, but is used for the antenna changeover channel state information (CSI) transmission time of the terminal. In the drawing, Slot4 is a switching time and a period during which the terminal transmits the channel state information (CSI). A process of collecting the antenna changeover channel state information in all of the above antennas #1 to #8 is implemented, for example, periodically or regularly.

In the example, in Slot1 to Slot4, the reference signal is transmitted from the base station device, and the channel state information is fed back from the terminal. However, in a TDD system in which the sounding signal is transmitted from the terminal, the channel state information is obtained in the base station according to the sounding signal, and the channel state information is used as the downlink channel state information as described above, only the reception in the uplink may be changed over to another.

After Slot4, the antenna port <1> of the base station device is allocated to the antenna #1 in both of the DL and UL, the antenna port <2> of the base station device is allocated to the antenna #2 in only the UL, and the SIMO communication is implemented in a given period.

FIG. 13 illustrates an operational example of the DAS switch when the MIMO is applied. Unlike in FIG. 12, in FIG. 13, when the period of Slot1 to Slot4 is ended, the antenna ports <1> and <2> of the base station device are always allocated to the antennas #1 and #2, and the MIMO communication is implemented.

5. Travel Operation of Antennas

Figure 14:
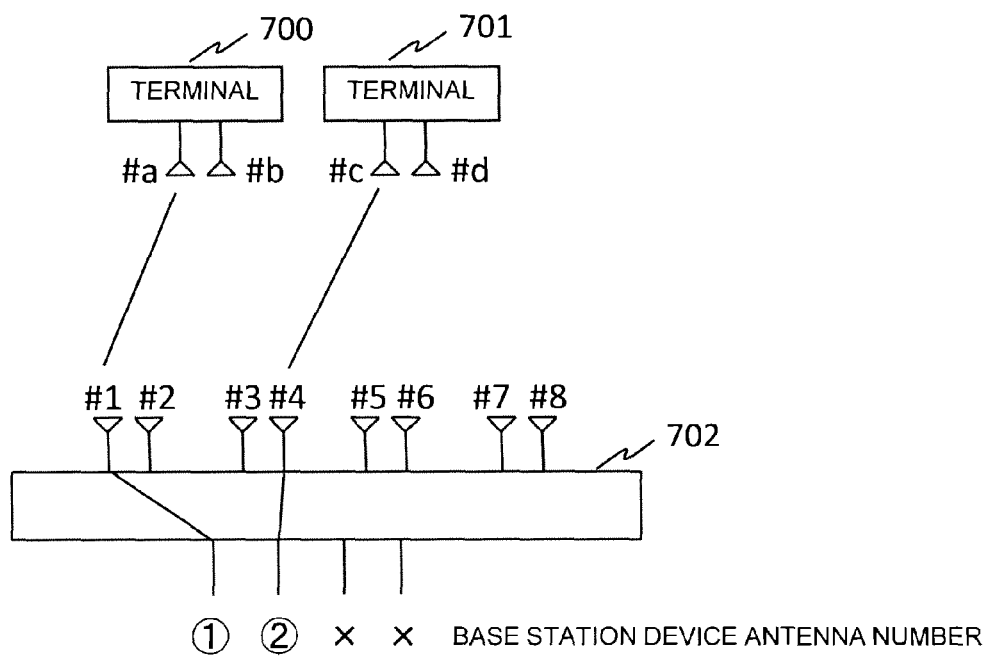
FIG. 14 is a diagram illustrating a DAS switch (plural terminals are MIMO) according to still another embodiment.

FIG. 14 illustrates a configuration in which plural terminals is coupled to a DAS switch, and the SISO communication is conducted therebetween. In the figure, in a DAS switch 702, the antenna ports <1> and <2> of the base station device are connected to the antennas #1 and #4, respectively. Also, the SISO communication is conducted between the antennas #1, #4 and the terminals 700, 701.

Figure 15:
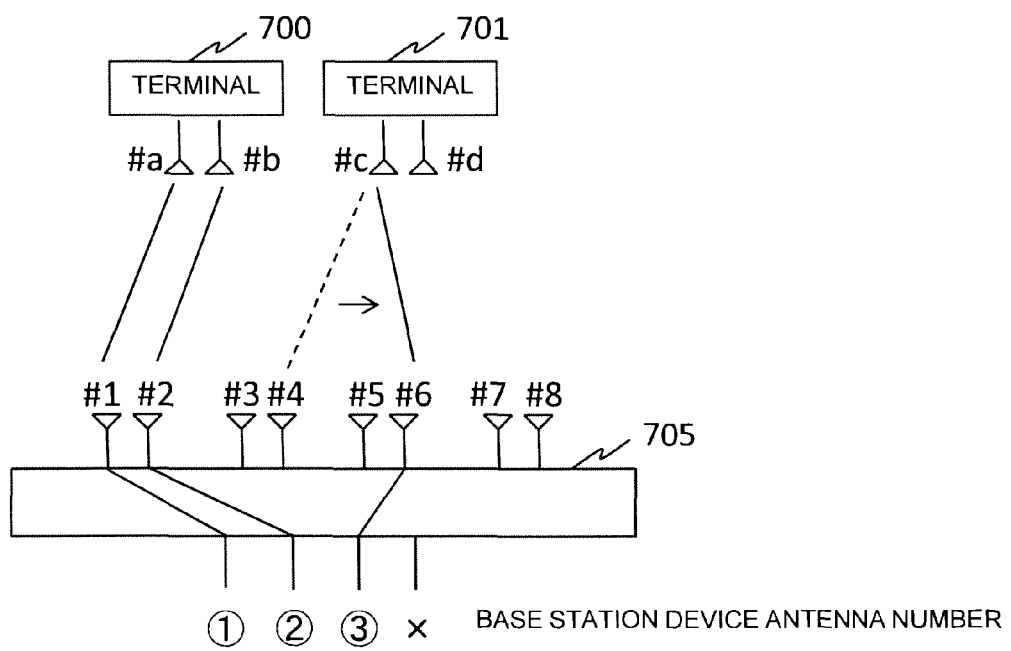
FIG. 15 is a diagram illustrating a DAS switch (MIMO and SISO) according to still another embodiment.

FIG. 15 illustrates a state in which the antenna is re-allocated when the MIMO is applied to a terminal 700, from the state of FIG. 14. In the figure, in a DAS switch 705, the antenna ports <1> and <2> of the base station device are connected to the antennas #1 and #2, respectively. When the MIMO starts between the antennas #1, #2, and the terminal 700, a terminal 701 that conducts the SISO communication travels to an antenna that is less in interference with the MIMO communication, that is, the antenna #6 in this example. More specifically, with the CINR as a determination parameter, reallocation from the antenna #4 to the antenna #6 is implemented. In this example, the antenna #6 is connected to the antenna port <3> of the base station device.

As described above, when the given terminal starts the MIMO, the terminal that conducts, for example, the SISO or the SIMO can travel to the antenna less in the interference with the MIMO communication with a CINR value as the parameter.

In this example, it is assumed that a known pilot signal is transmitted from the antenna #i at the base station device side, and as a result of estimating a channel of the signal received by the antenna #j at the terminal side, the channel state information is $h_{ij}$. In the SISO communication between the antenna #4 of the base station device and the terminal 701, each desired wave, each interference wave, and noise are represented as follows. In the following case, when it is assumed that an overall transmitting power of the base station device is P, each transmitting power of the antennas #1 and #2 is allocated to P/4, and a transmitting power of the antenna #4 is allocated to P/2. The other power allocation can be also calculated in the same technique.

[Math. 1]

$$\text{Desired wave } (\# \; c): \frac{P}{2}|h_{4c}|^2 \quad \text{(Ex. 1)}$$

$$\text{Desired wave } (\# \; d): \frac{P}{2}|h_{4d}|^2 \quad \text{(Ex. 2)}$$

$$\text{Interference wave (antenna \# } c): \frac{P}{4}|h_{1c}|^2 + \frac{P}{4}|h_{2c}|^2 \quad \text{(Ex. 3)}$$

$$\text{Interference wave (antenna \# } d): \frac{P}{4}|h_{1d}|^2 + \frac{P}{4}|h_{2d}|^2 \quad \text{(Ex. 4)}$$

Accordingly,

[Math. 2]

$$CINR \text{ (antenna \# } c): \frac{\frac{P}{2}|h_{4c}|^2}{\sigma^2 + \frac{P}{4}|h_{1c}|^2 + \frac{P}{4}|h_{2c}|^2} \quad \text{(Ex. 5)}$$

$$CINR \text{ (antenna \# } d): \frac{\frac{P}{2}|h_{4d}|^2}{\sigma^2 + \frac{P}{4}|h_{1d}|^2 + \frac{P}{4}|h_{2d}|^2} \quad \text{(Ex. 6)}$$

$$CINR \text{ (terminal 701)}: \quad \text{(Ex. 7)}$$

$$\frac{\frac{P}{2}|h_{4c}|^2 + \frac{P}{2}|h_{4d}|^2}{2\sigma^2 + \frac{P}{4}|h_{1c}|^2 + \frac{P}{4}|h_{2c}|^2 + \frac{P}{4}|h_{1d}|^2 + \frac{P}{4}|h_{2d}|^2}$$

where $\sigma^2$ is a thermal noise power. In order to represent the CINR of the terminal 701, there is applied Expression 7 representing a synthetic diversity between the antennas #c and #d as well as an average of Expressions 5 and 6, or a method of selecting any expression larger in value from Expression 5 and Expression 6 (selection diversity).

6. Sequence 2 (A Case in which Plural Terminals is Provided)

Figure 16:
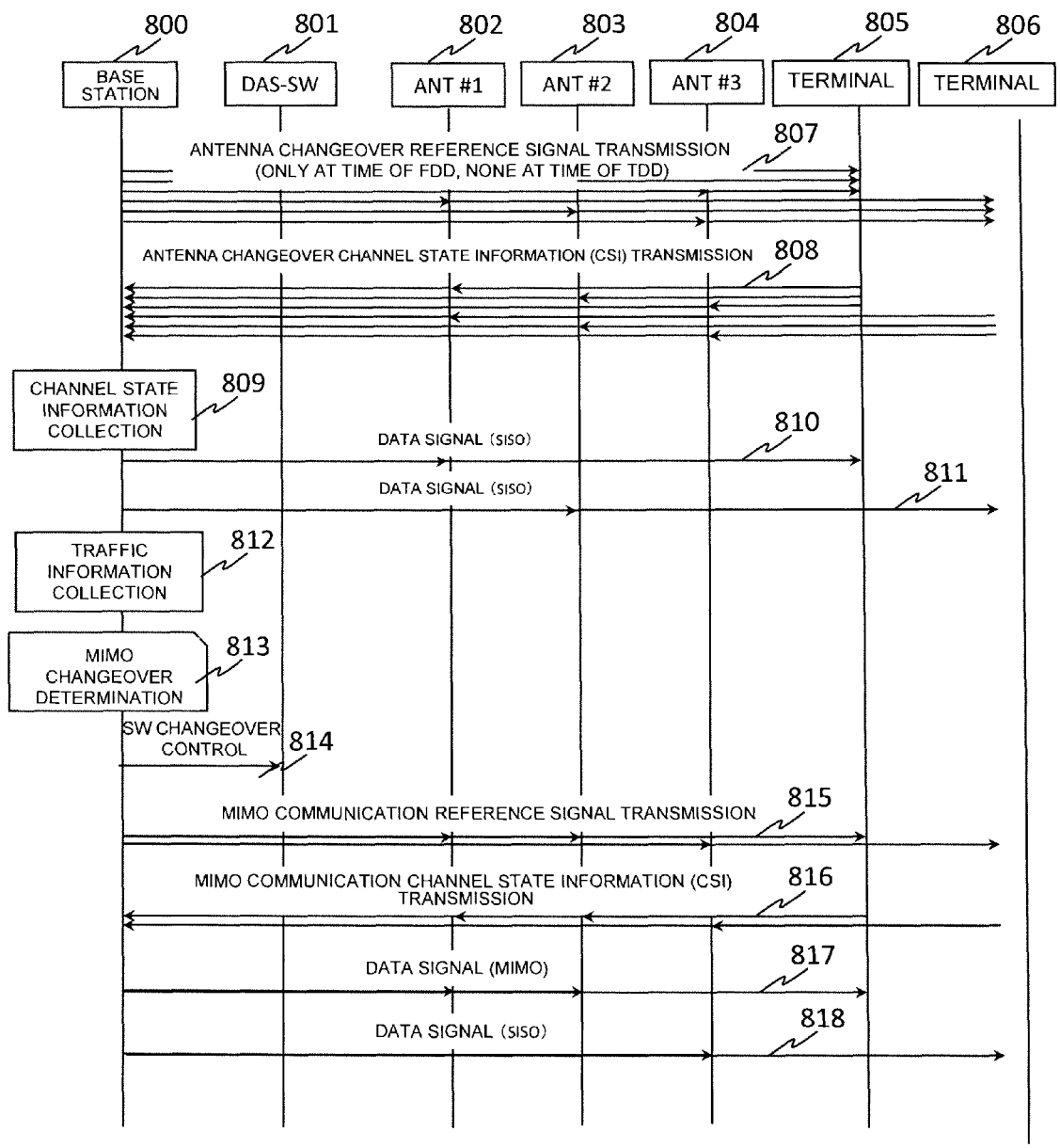
FIG. 16 is a sequence diagram when plural terminals is provided.

FIG. 16 illustrates a sequence between the base station device and the terminal when plural terminals is provided. An antenna changeover reference signal 807 transmitted from a base station 800 goes through a DAS switch 801, and is transmitted from antennas 802 to 804, and received by terminals 805 and 806. Thereafter, the terminals 805 and 806 obtain the channel state information (CSI) according to the reference signal through the channel estimation processing, and transmit antenna changeover channel state information (CSI) 808. The antenna changeover channel state information (CSI) 808 is received by the respective antennas 802 to 804, goes through the DAS switch 801, and is received by the base station 800. Thereafter, in a channel state information collection 809, the channel state information collection unit 305 brings the acquired channel state information into a database. The details of the database will be described later with reference to FIG. 20. In the TDD system, as described above, the sounding signal transmitted by the terminal is received by the base station device, and subjected to the channel estimation processing to collect the channel state information, and the channel state information is used as the downlink channel state information. In this case, data signals (SISO) 810 and 811 are transmitted from the base station 800 to the terminals 805 and 806. In this situation, in a traffic information collection 812, the data traffic volume is tallied by the traffic information collection unit 303. In this example, the SISO is assumed. Apart from this example, a case in which the data signal is transmitted through an appropriate communication system such as the SIMO or the MIMO can be assumed.

On the basis of the above traffic information and channel state information, in an MIMO changeover determination 813, after the MIMO changeover determination unit 307 determines whether the MIMO is implemented, or not, a switch changeover control 814 is conducted by the control signal processing unit 308 with respect to the DAS switch 801 from the base station 800.

Upon completion of the switch changeover control, an MIMO communication reference signal 815 from the base station 800 passes through the DAS switch 801, is transmitted from the antennas 802 to 804, and received by the terminals 805 and 806. Thereafter, the terminals 805 and 806 obtain the channel state information from the reference signal, and transmit an MIMO communication channel state information (CSI) 816. The MIMO communication channel state information (CSI) 816 is received by the base station 800 through the antennas 802 to 804 and the DAS switch 801. A data signal (MIMO) 817 transmitted from the base station 800 goes through the DAS switch 801, and is transmitted from the antennas 802 and 803 to the terminal 805. Further, a data signal (SISO) transmitted from the base station 800 goes through the DAS switch 801, and is transmitted from the antenna 804 to the terminal 806. In this example, the terminal 805 conducts the MIMO communication, and the terminal 806 conducts the SIMO communication. However, the present invention is not limited to this configuration, but the respective terminals can be communicated through an appropriate communication system set by the MIMO changeover determination.

FIG. 17 illustrates an operational example of the DAS switch in reallocation of the antenna coupled to another terminal that conducts the SISO to an antenna less in the interference with the MIMO communication when the MIMO communication starts. In the periods of Slot1 to Slot4, the operation is identical with that in FIG. 12. After Slot4, the antenna port <1> of the base station device is allocated to the antenna #1 in both of the DL and UL, the antenna port <2> of the base station device is allocated to the antenna #4 in both of the DL and UL, and two terminals conduct the SISO communication. It is assumed that because the traffic increases at a given time, one terminal (user 1) starts the MIMO communication with the use of the antennas #1 and #2. In this situation, it is assumed that the antenna ports <1> and <2> of the base station device are allocated to the antennas #1 and #2, respectively. Before the MIMO starts, the remaining terminal (user 1) conducts a communication with the use of the antenna port <2> of the base station device for the antenna #4. However, because the antenna port <2> of the base station device is used by the terminal (user 1) that starts the MIMO communication, the antenna #6 less in interference is re-allocated. In this figure, the antenna #6 connected to the antenna port <3> of the base station device is re-allocated to the user 2. As in FIG. 12, it is assumed that a process of collecting the antenna changeover channel state information in all of the antennas #1 to #8 is implemented regularly or periodically.

As described above, when a given terminal starts the MIMO, the terminal that conducts the SISO or the SIMO can travel to the antenna less in the interference with the MIMO communication with the CINR value as a parameter (a specific MIMO changeover determination flow is referred to "C. Third Embodiment", FIG. 18, and its description.)

FIG. 20 illustrates a database layout of the channel state information (CSI).

This database has the channel state information 306, and the antenna numbers corresponding to the number of antennas to be used are stored in association with the channel state information (CSI) of the terminal within the area. FIG. 20 illustrates an example of eight antennas.

B. Second Embodiment

Figure 7:
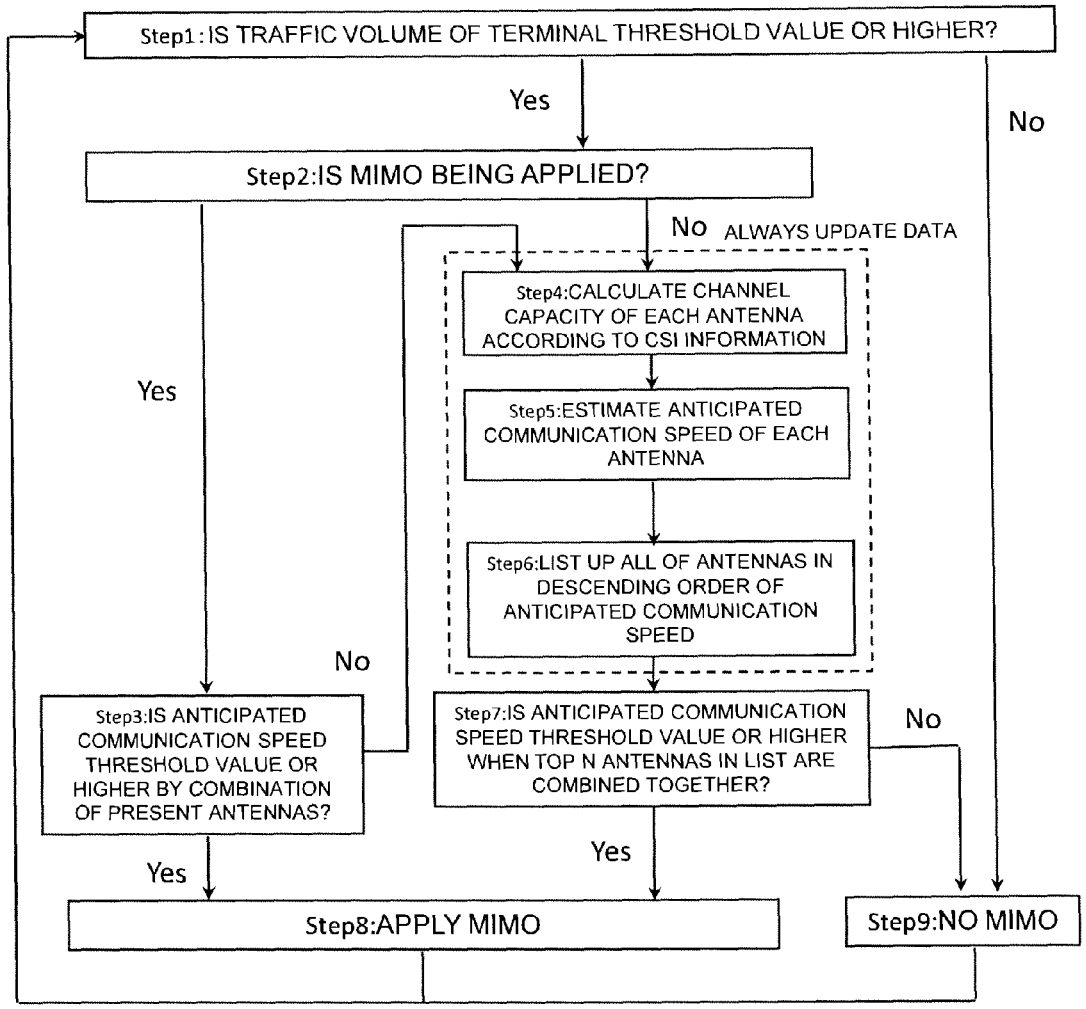
FIG. 7 is a flowchart illustrating an example (No. 2) of the MIMO changeover determination unit within the base station.

FIG. 7 is a flowchart illustrating an example (No. 2) of the MIMO changeover determination unit within the base station. FIG. 7 illustrates another embodiment of the flowchart of FIG. 5 in the first embodiment. A treatment of the antennas after the MIMO is applied is partially different from that in FIG. 5.

If the traffic to the terminal exceeds a given threshold value (Step 1), it is discriminated whether the MIMO is being currently applied, or not (Step 2). If the MIMO is being applied, and the anticipated communication speed is the threshold value or higher with the combination of the present antennas (Step 3), the present antennas are continuously used, and the MIMO communication is implemented (Step 8). In Step 2, if the MIMO is not being applied, or the anticipated communication speed is lower than the threshold value in Step 3, the processing is advanced to Step 4.

After Step 4, as in FIG. 5, the channel capacity of the respective antennas is calculated according to the antenna changeover channel state information (CSI), and the anticipated communication speed is estimated on the basis of the calculated channel capacity in Step 5. The anticipated communication speed is calculated by, for example, dividing the channel capacity by the number of terminals coupled to the antenna. Thereafter, all of the antennas are listed up in the descending order of the anticipated communication speed (Step 6). Further, when the top N antennas in the list are combined together, if the anticipated communication speed is a threshold value or higher (Step 7), the MIMO is applied (Step 8). If the traffic volume is lower than the threshold value in Step 1, or the anticipated communication speed is lower than the threshold value in Step 7, no MIMO is applied (Step 9). After Step 8 or 9, the processing is returned to Step 1. The MIMO changeover determination is implemented regularly or periodically. Data (CSI information) is updated every time the MIMO changeover is determined, and therefore, the top antennas in the anticipated communication speed list are applied for the MIMO communication.

C. Third Embodiment

Figure 18:
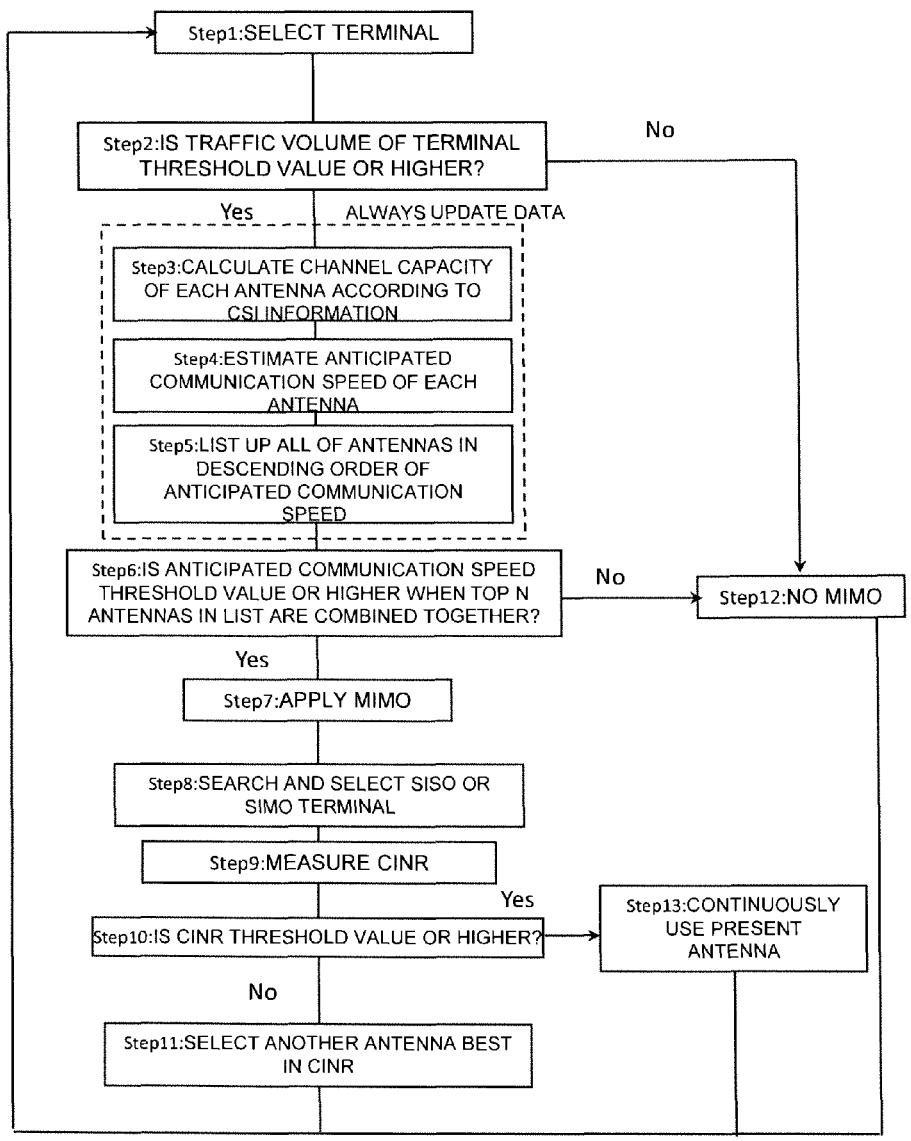
FIG. 18 is a flowchart illustrating an example (No. 3) of an MIMO changeover determination unit within the base station.

FIG. 18 is a flowchart illustrating an example (No. 3) of the MIMO changeover determination unit within the base station. FIG. 18 illustrates another embodiment of the flowchart of FIG. 5 in the first embodiment. FIG. 18 illustrates a flowchart of the MIMO changeover determination unit when a specific terminal starts the MIMO communication, another terminal that conducts the SISO communication or the SIMO communication is re-allocated to the antenna less in the interference with the MIMO communication.

First, as in FIG. 5, after the subject terminal is selected (Step 1), it is determined whether the traffic volume of the terminal is the threshold value or higher, or not (Step 2). If the traffic volume is the threshold value or higher in Step 2, the channel capacity of the respective antennas is calculated according to the channel state information (CSI) (Step 3). Thereafter, the anticipated communication speed of the respective antennas is estimated (Step 4). As one method of estimating the anticipated communication speed, the channel capacity is divided by the number of users coupled to the antennas. Thereafter, all of the antennas are listed up in the descending order of the anticipated communication speed (Step 5), and if the top N antennas in the list are combined together, it is discriminated whether the anticipated communication speed is the threshold value or higher, or not (Step 6). If the anticipated communication speed is the threshold value or higher in Step 6, the MIMO is applied (Step 7).

After the MIMO is applied, the terminal that conducts the SISO or SIMO communication around is searched and selected (Step 8). In order to check the degree of interference of the subject terminal with the terminal that starts the MIMO communication, the CINR is measured (Step 9), and it is discriminated whether the CINR is the threshold value or higher, or not (Step 10). If the CINR of the antenna that is currently communicating is lower than the threshold value, another antenna highest in the CINR among the other antennas is selected (Step 11). If the CINR of the antenna that is presently communicating is the threshold value or higher, it is determined that an influence of the interference with the terminal that conducts the MIMO communication is less, and the subject terminal continuously uses the antenna currently coupled to the terminal, and conducts the SISO communication or the SIMO communication (Step 13). In this example, if the traffic volume or the anticipated communication speed is lower than the threshold value in Step 2 or 6, no MIMO is applied (Step 12). Upon completion of the processing in Steps 11, 12, and 13, the processing is returned to Step 1.

The CINR may be replaced with the SNR.

As described above, when a given terminal starts the MIMO, the terminal that conducts the SISO or the SIMO can travel to the antenna less in the interference with the MIMO communication with the CINR value or the SNR value as a parameter.

D. Fourth Embodiment

Figure 21:
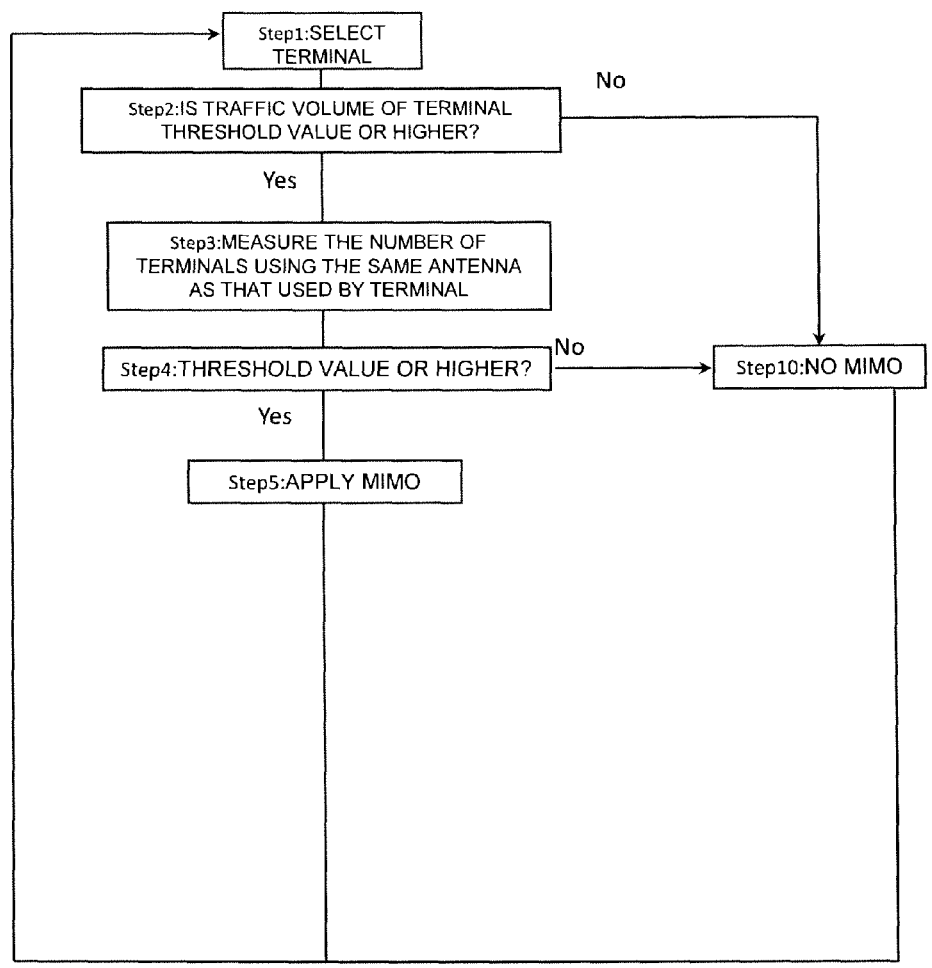
FIG. 21 is a flowchart illustrating an example (No. 4) of an MIMO changeover determination unit within the base station.

FIG. 21 is a flowchart illustrating an example (No. 4) of the MIMO changeover determination unit within the base station. FIG. 21 illustrates another embodiment of the flowchart of FIG. 5 in the first embodiment. FIG. 21 illustrates an example of the flowchart of the MIMO changeover determination unit in which, when the traffic volume of a specific terminal increases, if the number of terminals coupled to the same antenna as that of the specific terminal exceeds an upper limit, the MIMO is applied.

After the subject terminal is selected (Step 1), it is discriminated whether the traffic volume of the terminal is a threshold value or higher, or not (Step 2). If the traffic volume is the threshold value or higher in Step 2, the number of other terminals coupled to the same antenna as the antenna used by the subject terminal is measured (Step 3). Thereafter, it is discriminated whether the number of measured terminals is the threshold value or higher, or not (Step 4). If the number of terminals is the threshold value or higher, the MIMO is applied (Step 5). On the other hand, if the traffic volume is lower than the threshold value in Step 2, or if the number of terminals is lower than the threshold value in Step 4, no MIMO is applied (Step 10).

E. Fifth Embodiment

Figure 22:
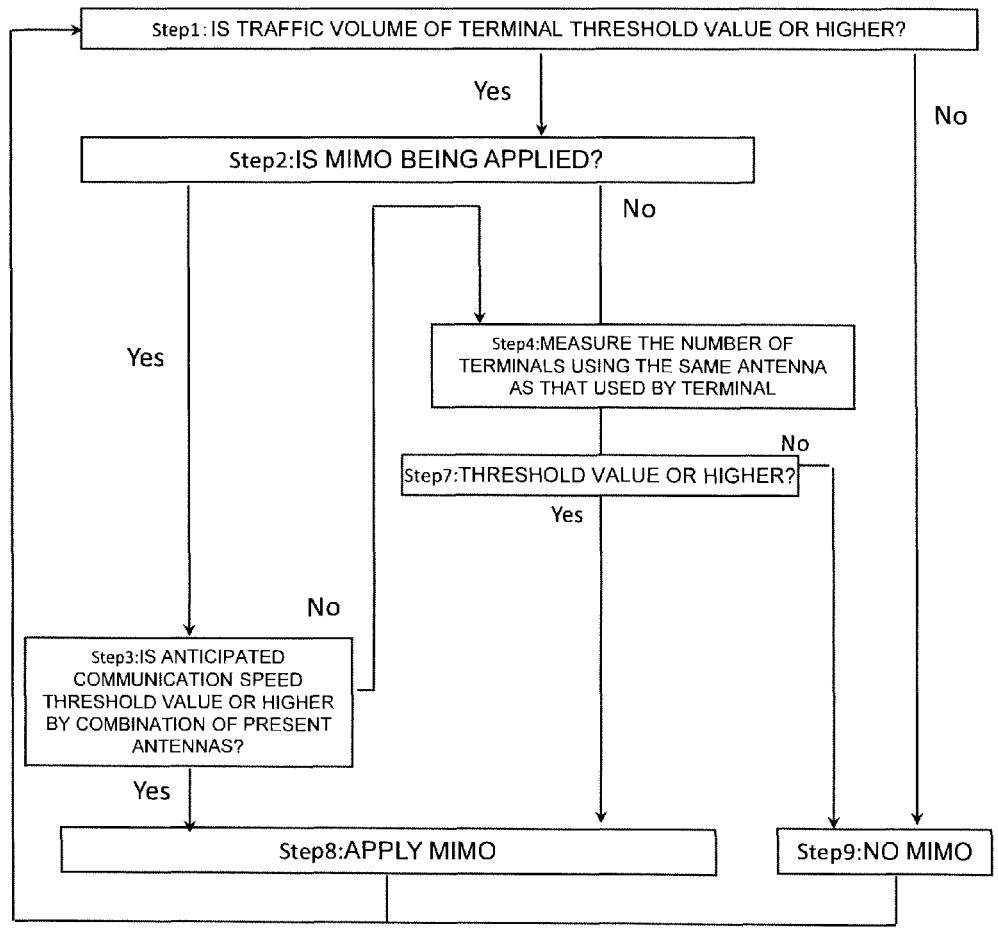
FIG. 22 is a flowchart illustrating an example (No. 5) of an MIMO changeover determination unit within the base station.

FIG. 22 is a flowchart illustrating an example (No. 5) of the MIMO changeover determination unit within the base station. FIG. 22 illustrates another embodiment of the flowchart of FIG. 5 in the first embodiment or the flowchart of FIG. 21 in the fourth embodiment. A treatment of the antennas after the MIMO is applied is partially different from that in FIG. 21.

If the traffic to the terminal exceeds a given threshold value (Step 1), it is discriminated whether the MIMO is being currently applied, or not (Step 2). If the MIMO is being applied, and the anticipated communication speed is the threshold value or higher with the combination of the present antennas (Step 3), the present antennas are continuously used, and the MIMO communication is implemented (Step 8). In Step 2, if the MIMO is not being applied, or the anticipated communication speed is lower than the threshold value in Step 3, the processing is advanced to Step 4.

After Step 4, as in FIG. 21, the number of other terminals coupled to the same antenna as the antenna used by the subject terminal is measured (Step 4). Thereafter, it is discriminated whether the number of measured terminals is the threshold value or higher, or not (Step 7). If the number of terminals is the threshold value or higher, the MIMO is applied (Step 8). On the other hand, if the traffic volume is lower than the threshold value in Step 1, or if the number of terminals is lower than the threshold value in Step 7, no MIMO is applied (Step 9). After Step 8 or Step 9, the processing is returned to Step 1.

F. Sixth Embodiment

Figure 19:
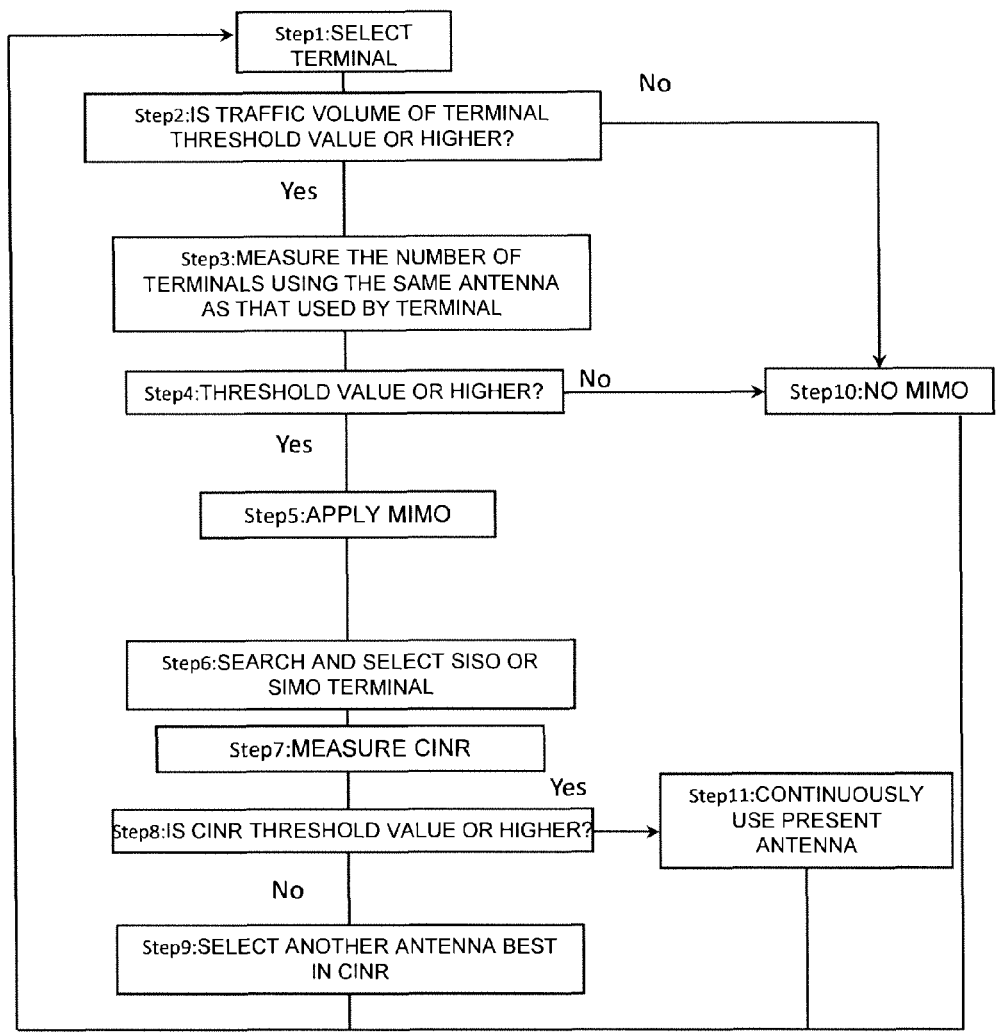
FIG. 19 is a flowchart illustrating an example (No. 6) of an MIMO changeover determination unit within the base station.

FIG. 19 is a flowchart illustrating an example (No. 6) of the MIMO changeover determination unit within the base station. FIG. 19 illustrates another embodiment of the flowchart of FIG. 5 in the first embodiment or the flowchart of FIG. 21 in the fourth embodiment. FIG. 19 illustrates a flowchart of the MIMO changeover determination unit in which when a specific terminal starts the MIMO communication, another terminal that conducts the SISO communication or the SIMO communication is re-allocated to the antenna less in the interference with the MIMO communication.

After the subject terminal is selected (Step 1), it is discriminated whether the traffic volume of the terminal is a threshold value or higher, or not (Step 2). If the traffic volume is the threshold value or higher in Step 2, the number of other terminals coupled to the same antenna as the antenna used by the subject terminal is measured (Step 3). Thereafter, it is discriminated whether the number of measured terminals is the threshold value or higher, or not (Step 4). If the number of terminals is the threshold value or higher, the MIMO is applied (Step 5). On the other hand, if the traffic volume is lower than the threshold value in Step 2, or if the number of terminals is lower than the threshold value in Step 4, no MIMO is applied (Step 10).

After the MIMO is applied, as in FIG. 18, the terminal that conducts the SISO communication or the SIMO communication around is searched and selected (Step 6). In order to check the degree of interference of the subject terminal with the terminal that starts the MIMO communication, the CINR is measured (Step 7), and it is discriminated whether the CINR is the threshold value or higher, or not (Step 8). If the CINR of the antenna that is currently communicating is lower than the threshold value, another antenna highest in the CINR among the other antennas is selected (Step 9). If the CINR of the antenna that is presently communicating is the threshold value or higher, it is determined that an influence of the interference with the terminal that conducts the MIMO communication is less, and the subject terminal continuously uses the antenna currently coupled to the terminal, and conducts the SISO communication or the SIMO communication (Step 11). In this example, if the traffic volume or the number of terminals is lower than the threshold value in Step 2 or 4, no MIMO is applied (Step 10). Upon completion of the processing in Steps 9, 10, and 11, the processing is returned to Step 1.

The CINR may be replaced with the SNR.

As described above, when a given terminal starts the MIMO, the terminal that conducts the SISO or the SIMO can travel to the antenna less in the interference with the MIMO communication with the CINR value or the SNR value as a parameter.

The present invention can be applied to a variety of distributed antenna systems in which plural antennas is distributed in addition to the so-called DAS. Also, the processing has been described with an example of the communication speed. However, the present invention is not limited to this configuration, but the processing can be conducted with the aid of appropriate data such as throughput or data similar to the throughput.

What is claimed is:

1. A distributed antenna system comprising a base station device having a plurality of antenna ports, a terminal having a plurality of antennas, and an antenna switch configured to switch a connection between antennas of a plurality of distribution devices that are spatially distributed and the antenna ports of the base station device, in uplink and downlink communications, wherein the terminal is configured to conduct SISO, SIMO, and/or MIMO communication by using one or more of the plurality of antennas for transmission or reception as determined by the base station device: and the base station device comprises a control unit the control unit comprising:

a traffic information collection unit configured to collect traffic information on the uplink and downlink communications and store the traffic information in a traffic information database in the control unit:

a channel state information collection unit configured to collect information on radio propagation channels from the distributed antennas to the antennas of the terminal and store the information on radio propagation channels in a channel state information database in the control unit: and a changeover determination unit configured to determine a changeover between a first communication using a plurality of antennas for communication with one terminal and a second communication using one antenna for transmission or reception with respect to one terminal, on a basis of information stored in the traffic information database and the channel state information database, and when a traffic volume of the terminal is lower than a given first threshold value, the changeover determination unit is configured to determine to conduct the second communication, when the traffic volume of the terminal is the first threshold value or higher, the changeover determination unit is configured to conduct a first determination that the terminal applies the first communication when the terminal is applying the first communication and a communication speed or throughput by the combination of the present antennas is a given second threshold value or higher, when the terminal is applying the first communication, and the communication speed or throughput by the combination of the present antennas is lower than the second threshold value, or the terminal is not applying the first communication, (i) the changeover determination unit is configured to determine to conduct a second determination that, when the plurality of antennas is combined together, the terminal applies the first communication if the communication speed or throughput is a given third threshold value or higher, and the terminal applies the second communication if the communication speed or throughput is lower than the third threshold value, or (ii) the changeover determination unit is configured to determine to conducts a third determination that the terminal applies the first communication if the number of other teuninals using the antenna used by the subject terminal is a fourth threshold value or higher, and applies the second communication if the number of other terminals is lower than the fourth threshold value.

2. The distributed antenna system according to claim 1, wherein in the second determination, a channel capacity of each antenna is calculated according to channel state information (CSI) between each antenna of the distributed antenna system and the terminal, an anticipated communication speed or throughput of each antenna is estimated on the basis of the calculated channel capacity, all of the antennas are listed up in a descending order of the anticipated communication speed or throughput, and when top N antennas (N is an integer of 1 or greater) in the list are combined together, the first communication is applied if the anticipated communication speed or throughput is the third threshold value or higher, and the second communication is applied if the anticipated communication speed or throughput is lower than the third threshold value.

3. The distributed antenna system according to claim 2, wherein N is a given fixed value or the number of antennas of which the communication speed or throughput is a given threshold value or higher.

4. The distributed antenna system according to claim 1, wherein, if the terminal applies the first communication according to the second determination, it is further determined whether another terminal applying the second communication selects another antenna or not, to reselect an optimum antenna.

5. The distributed antenna system according to claim 1, wherein if the terminal applies the first communication according the second determination, another terminal that conducts the second communication coupled to the antenna used by the terminal that conducts the first communication is selected, a carrier interference noise ratio (CINR) or a signal noise ratio (SNR) between the another terminal and each antenna is measured, it is determined whether the CINR or the SNR is a threshold value or higher, or not, if the CINR or the SNR is the threshold value or higher, the present antenna is continuously used, and if the CINR or the SNR is lower than the threshold value, an antenna best or better than a given value in the CINR or the SNR for another terminal that conducts the second communication, is reselected.

6. The distributed antenna system according to claim 1, wherein the base station device is configured to transmit an antenna changeover reference signal from each antenna, and calculate the communication speed or the throughput of each antenna on the basis of the CSI or the SNR received by each antenna from the terminal.

7. The distributed antenna system according to claim 1, wherein the base station device is configured to conduct channel estimation processing according to a sounding signal or another reference signal received from the terminal by each antenna, to obtain the channel state information (CSI) or the SNR, and calculate the communication speed or the throughput of each antenna on the basis of the obtained CSI or SNR.

8. The distributed antenna system according to claim 1, wherein the first communication is a multiple input multiple output (MIMO) communication, and the second communication is a single input single output (SISO) communication, or a single input multiple output (SIMO) communication.

9. A base station device in a distributed antenna system comprising the base station device having a plurality of antenna ports, a terminal having a plurality of antennas, and an antenna switch configured to switch a connection between antennas of a plurality of distribution devices that are spatially distributed and the antenna ports of the base station device, in uplink and downlink communications, comprising a control unit, the control unit comprising:

a traffic information collection unit configured to collect traffic information on the uplink and downlink communications and store the traffic information in a traffic information database in the control unit;

a channel state information collection unit configured to collect information on radio propagation channels from the distributed antennas to the antennas of the terminal and store the information on radio propagation channels in a channel state information database in the control unit; and a changeover deterimination unit configured to determine a changeover between a first communication using a plurality of antennas for communication with one terminal and a second communication using one antenna for transmission or reception with respect to one terminal, on a basis of information stored in the traffic information database and the channel state information database, and when a traffic volume of the terminal is lower than a given first threshold value, the changeover determination unit is configured to determine to conduct the second communication, when the traffic volume of the terminal is the first threshold value or higher, the changeover determination unit is configured to conduct a first determination that the terminal applies the first communication when the terminal is applying the first communication and a communication speed or throughput by the combination of the present antennas is a given second threshold value or higher, when the terminal is applying the first communication, and the communication speed or throughput by the combination of the present antennas is lower than the second threshold value, or the terminal is not applying the first communication,
(i) the changeover determination unit is configured to determine to conduct a second determination that, when the plurality of antennas is combined together, the terminal applies the first communication when the communication speed or throughput is a given third threshold value or higher, and the terminal applies the second communication when the communication speed or throughput is lower than the third threshold value, or
(ii) the changeover determination unit is configured to determine to conducts a third determination that the terminal applies the first communication when the number of other terminals using the antenna used by the subject terminal is a fourth threshold value or higher, and applies the second communication when the number of other terminals is lower than the fourth threshold value.

10. An antenna selection method in a distributed antenna system comprising a base station device having a plurality of antenna ports, a terminal having a plurality of antennas, and an antenna switch configured to switch a connection between antennas of a plurality of distribution devices that are spatially distributed and the antenna ports of the base station device, in uplink and downlink communications,
wherein the base station device comprises:
a traffic information collection unit configured to collect traffic information on the uplink and downlink communications;
a channel state information collection unit configured to collect information on radio propagation channels from the distributed antennas to the antennas of the terminal; and
a changeover determination unit configured to determine a changeover between a first communication using a plurality of antennas for communication with one terminal and a second communication using one antenna for transmission or reception with respect to one terminal., on the basis of information from the traffic information collection unit and the channel state information collection unit, and
when a traffic volume of the terminal is lower than a given first threshold value,
the changeover determination unit determines to conduct the second communication,
when the traffic volume of the terminal is the first threshold value or higher,
the changeover determination unit conducts a first determination that the terminal applies the first communication when the terminal is applying the first communication and a communication speed or throughput by the combination of the present antennas is a given second threshold value or higher,
when the terminal is applying the first communication, and the communication speed or throughput by the combination of the present antennas is lower than the second threshold value, or the terminal is not applying the first communication,
(i) the changeover determination unit determines to conduct a second determination that, when the plurality of antennas is combined together, the terminal applies the first communication when the communication speed or throughput is a given third threshold value or higher, and the terminal applies the second communication when the communication speed or throughput is lower than the third threshold value, or
(ii) the changeover determination unit determines to conducts a third determination that the terminal applies the first communication when the number of other terminals using the antenna used by the subject terminal is a fourth threshold value or higher, and applies the second communication when the number of other terminals is lower than the fourth threshold value.

11. The antenna selection method according to claim 10, wherein
in the second determination,
a channel capacity of each antenna is calculated according to channel state information (CSI) between each antenna of the distributed antenna system and the terminal,
an anticipated communication speed or throughput of each antenna is estimated on the basis of the calculated channel capacity,
all of the antennas are listed up in a descending order of the anticipated communication speed or throughput, and
when top N antennas (N is an integer of 1 or greater) in the list are combined together, the first communication is applied if the anticipated communication speed or throughput is the third threshold value or higher, and the second communication is applied if the anticipated communication speed or throughput is lower than the third threshold value.

12. The antenna selection method according to claim 11, wherein N is a given, fixed value or the number of antennas of which the communication speed or throughput is a given threshold value or higher.

13. The antenna selection method according to claim 10, wherein, when the terminal applies the first communication according to the second determination, it is further determined whether another terminal applying the second communication selects another antenna or not, to reselect an optimum antenna.

14. The antenna selection method according to claim 10, wherein
when the terminal applies the first communication according the second determination,
another terminal that conducts the second communication coupled to the antenna used by the terminal that conducts the first communication is selected,
a carrier interference noise ratio (CINR) or a signal noise ratio (SNR) between the another terminal and each antenna is measured,
it is determined whether the CINR or the SNR is a threshold value or higher, or not,
when the CINR or the SNR is the threshold value or higher, the present antenna is continuously used, and
when the CINR or the SNR is lower than the threshold value, an antenna best or better than a given value in the CINR or the SNR for another terminal that conducts the second communication, is reselected.

15. The antenna selection method according to claim 10, wherein
the base station device
transmits an antenna changeover reference signal from each antenna, and
calculates the communication speed or the throughput of each antenna on the basis of the CSI or the SNR received by each antenna from the terminal.

16. The antenna selection method according to claim 10, wherein
the base station device
conducts channel estimation processing according to a sounding signal or another reference signal received from the terminal by each antenna, to obtain the channel state information (CSI) or the SNR, and calculates the communication speed or the throughput of each antenna on the basis of the obtained CSI or SNR.

17. The antenna selection method according to claim 10, wherein the first communication is a multiple input multiple output (MIMO) communication, and the second communication is a single input single output (SISO) communication, or a single input multiple output (SIMO) communication.

\* \* \* \* \*